Dec. 22, 1925.
G. C. CHASE
1,566,650
OPERATING MEANS FOR CALCULATORS
Filed Nov. 21, 1922
11 Sheets-Sheet 1
MONOPHASE.
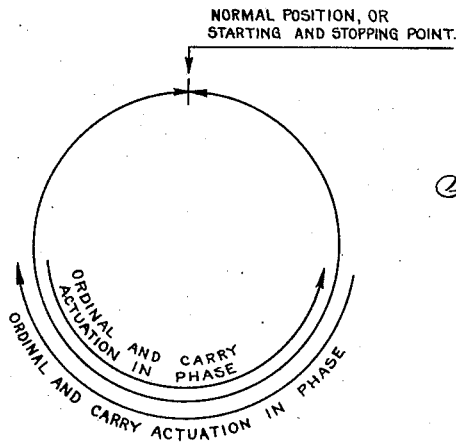
POLYPHASE.
NON REVERSIBLE CYCLE.
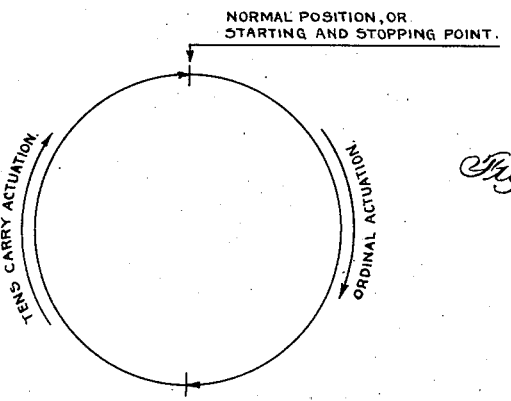
POLYPHASE
REVERSIBLE CYCLE.
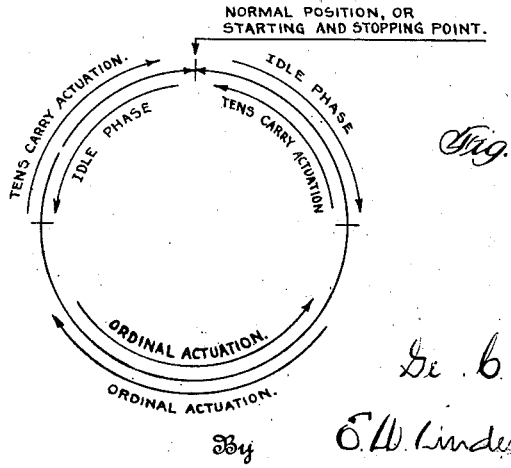

Dec. 22, 1925.

G. C. CHASE 1,566,650

OPERATING MEANS FOR CALCULATORS

Filed Nov. 21, 1922    11 Sheets-Sheet 2

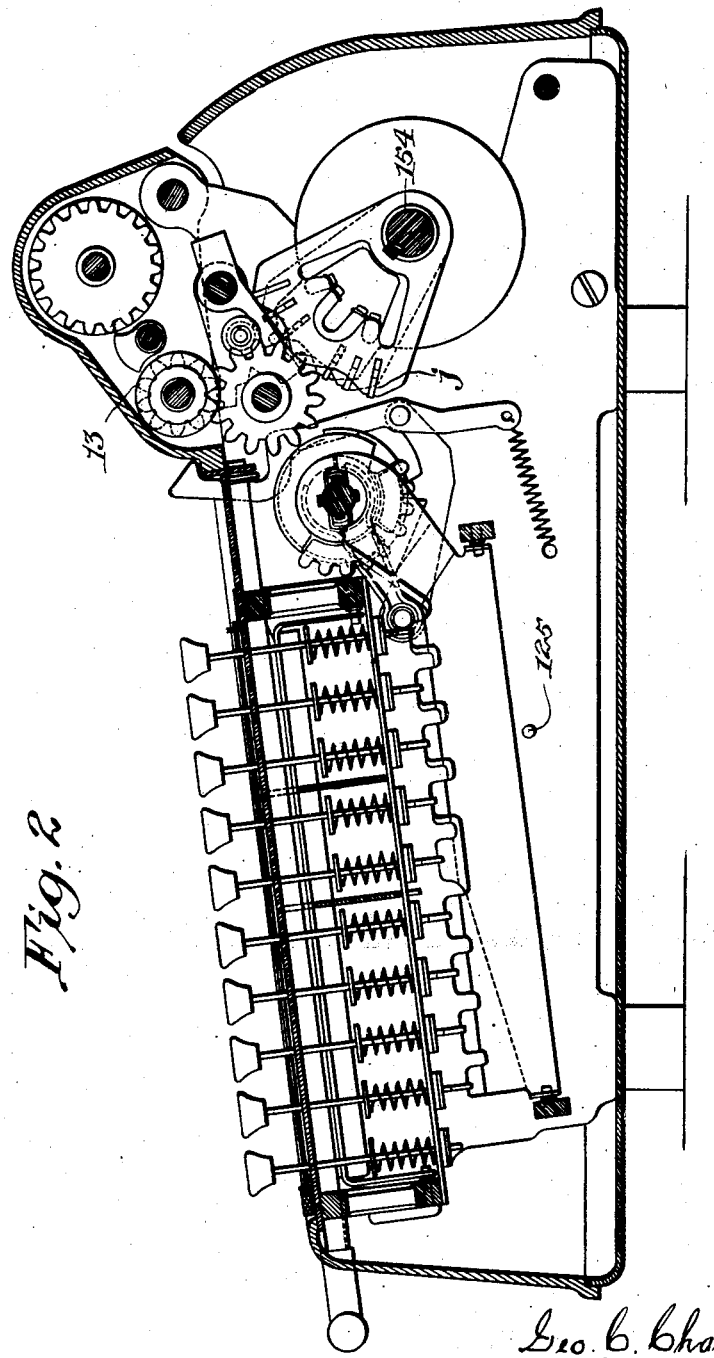

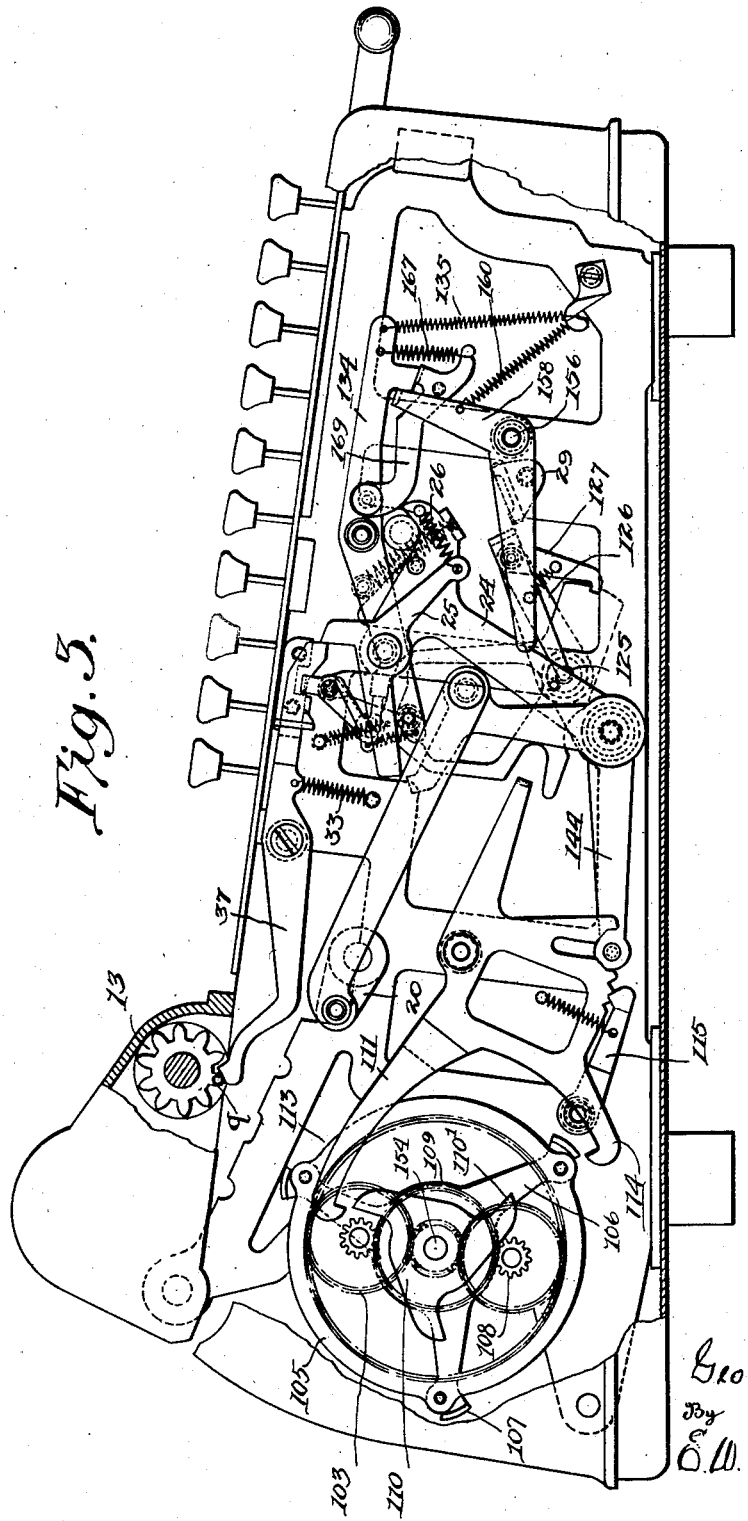

Dec. 22, 1925.
G. C. CHASE
1,566,650
OPERATING MEANS FOR CALCULATORS
Filed Nov. 21, 1922
11 Sheets—Sheet 5
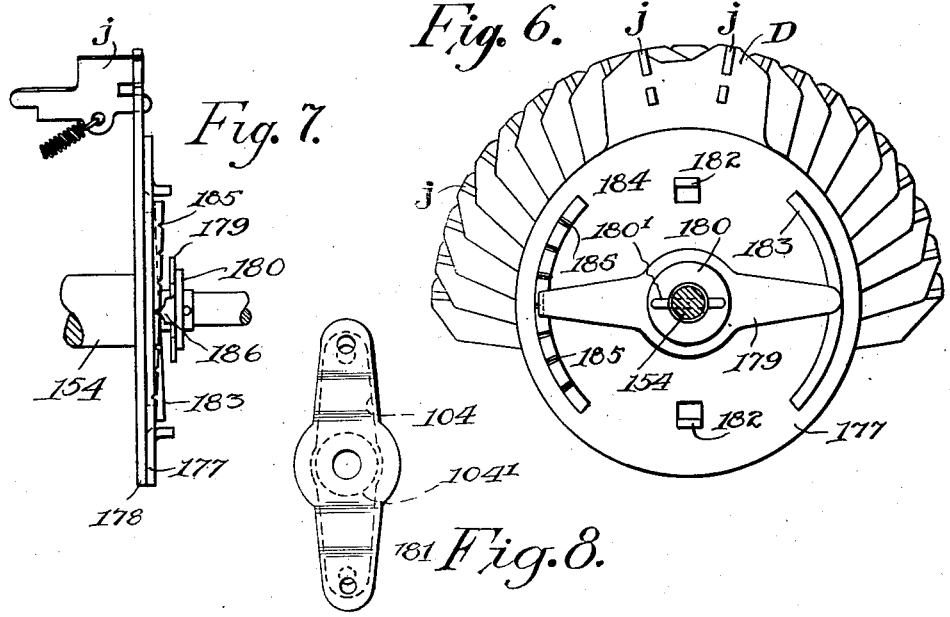
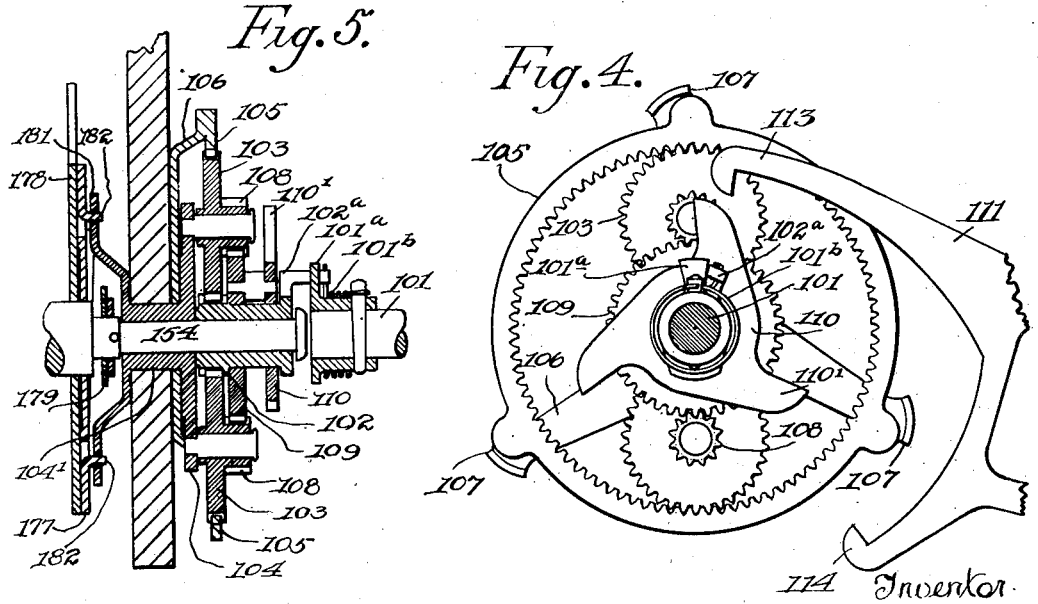
Inventor
Geo. C. Chase
By O. W. Anderson Son
Attorneys

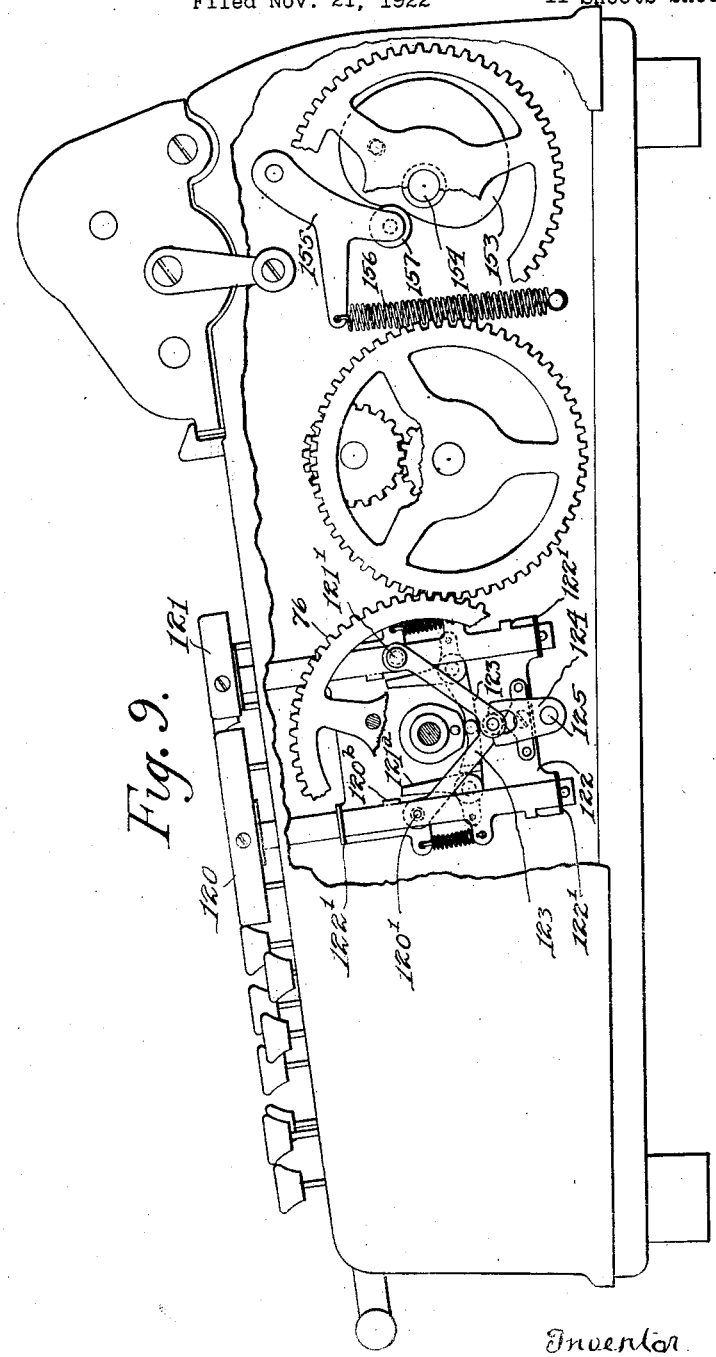

Dec. 22, 1925.
G. C. CHASE
1,566,650
OPERATING MEANS FOR CALCULATORS
Filed Nov. 21, 1922    11 Sheets-Sheet 7
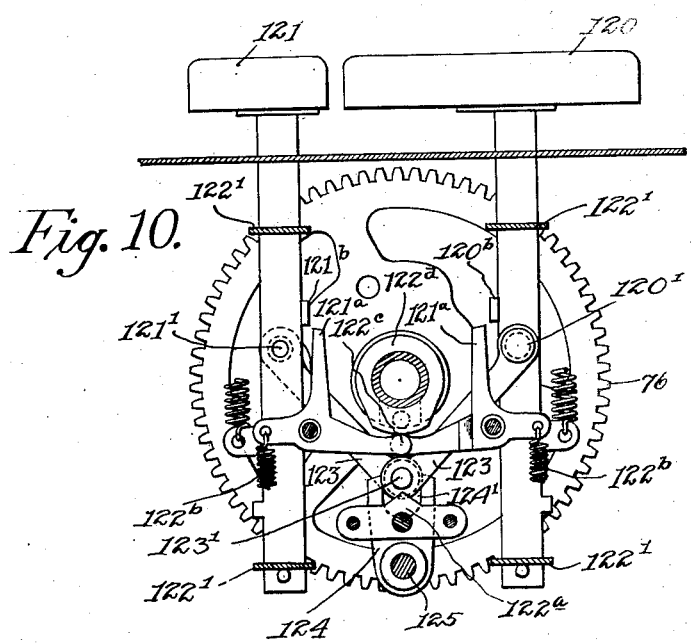
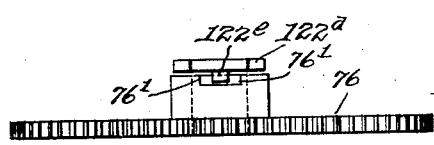
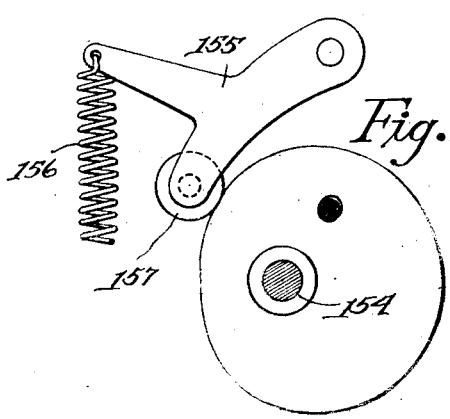
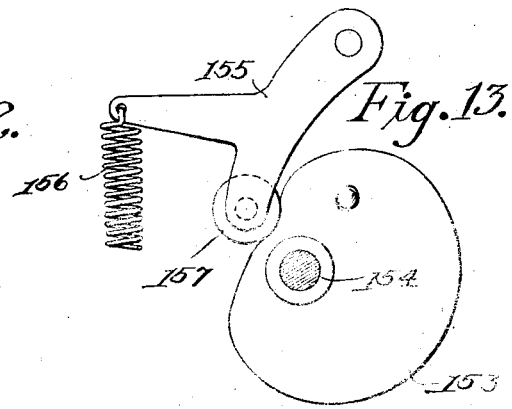

Dec. 22, 1925.
G. C. CHASE
1,566,650
OPERATING MEANS FOR CALCULATORS
Filed Nov. 21, 1922     11 Sheets-Sheet 8
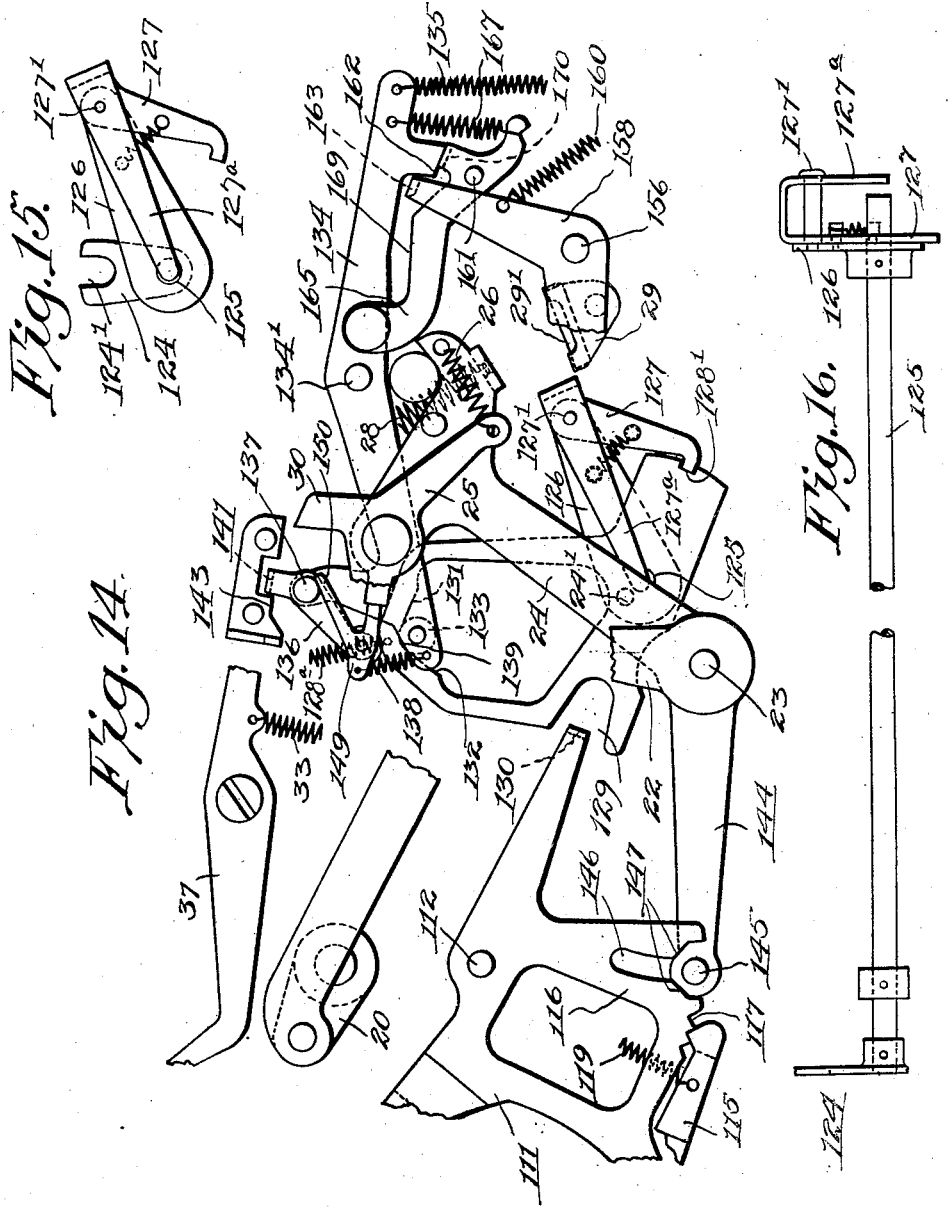
Inventor
Geo. C. Chase.
By E.W. Anderson
Attorney

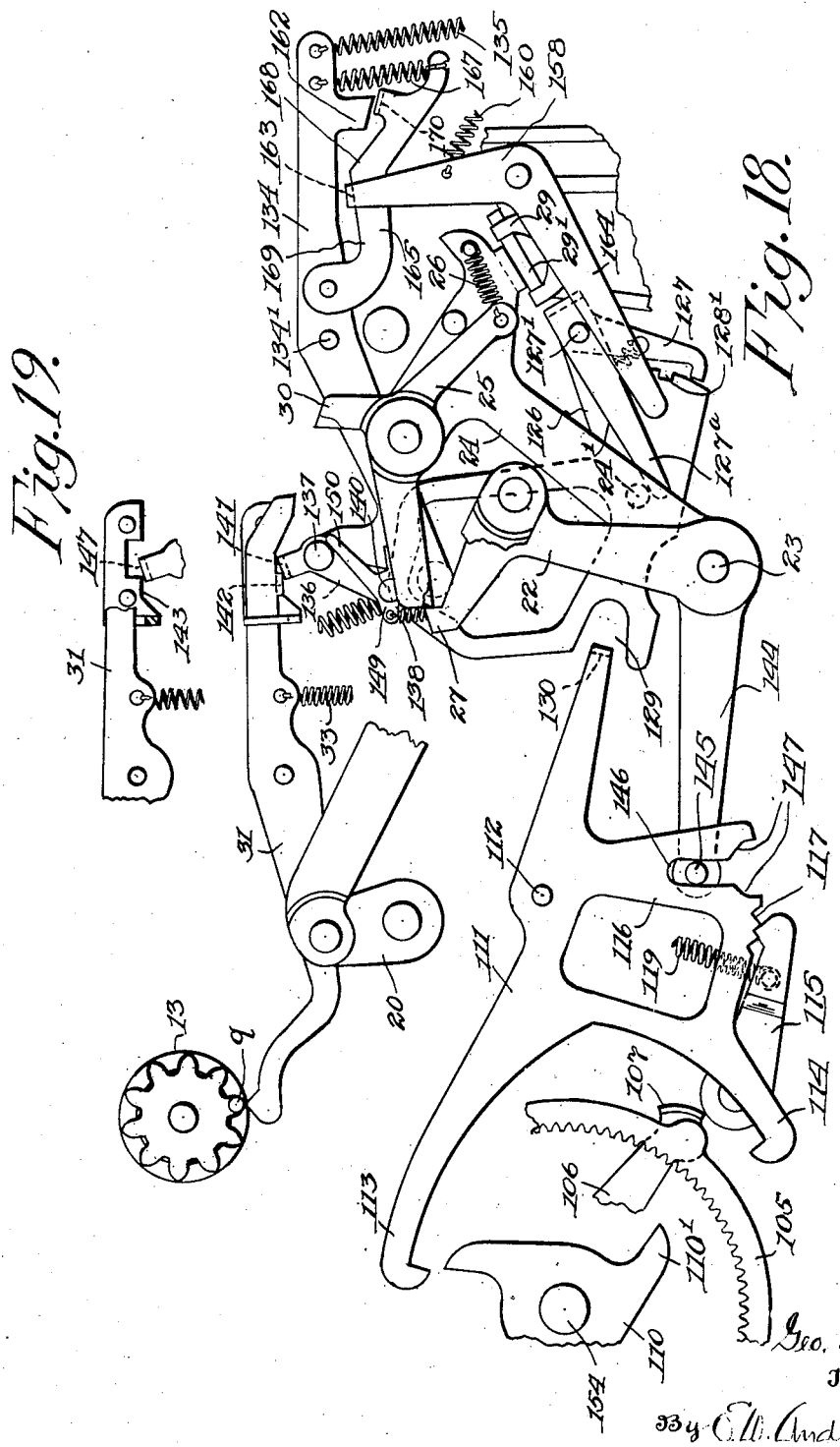

Patented Dec. 22, 1925.

1,566,650

UNITED STATES PATENT OFFICE.

GEORGE C. CHASE, OF SOUTH ORANGE, NEW JERSEY, ASSIGNOR TO MONROE CALCULATING MACHINE COMPANY, OF NEW YORK, N. Y., A CORPORATION OF NEW YORK.

OPERATING MEANS FOR CALCULATORS.

Application filed November 21, 1922. Serial No. 602,366.

*To all whom it may concern:*

Be it known that I, GEORGE C. CHASE, a citizen of the United States, residing at South Orange, in the county of Essex and State of New Jersey, have made a certain new and useful Invention in Operating Means for Calculators, of which the following is a specification.

Figure 2 is a vertical longitudinal section of the same, taken through the keyboard.

Figure 3 is a left side view of the machine, with parts of the casing broken away.

Figure 4 is a side view of the planetary gearing and associated driving members.

Figure 5 is a vertical section through the same, taken on the line of the carry shaft.

Figure 6 is a side view of the slip clutch devices and the rotary carry members.

Figure 7 is an edge view of the clutch disks and associated parts.

Figure 8 is a side view of a diametric arm member of the drive.

Figure 9 is a right side view of the machine, with the casing partially broken away.

Figure 10 is a side view, partly broken away, of the add and substract key group of mechanism, viewed from the interior of the machine, in reverse of Figure 9.

Figure 11 is a bottom plan view of the crank driving gear and the key-locking cam, showing the pin and slot engagement.

Figure 12 is a side view of a cam designed to balance the eccentric weight of the carry arms.

Figure 13 shows a modified form of cam, designed to cooperate with the stopping mechanism.

Figure 14 is an enlarged view of a portion of the mechanism shown in Figure 3, with parts also in normal position.

Figure 15 is a side view of the coupling pawl and associated parts.

Figure 16 is a rear view of the rock shaft and coupling pawl.

Figure 18 is a similar view, showing the position of the parts with the subtract key depressed and the full-cycle stop mechanism tripped from a numeral wheel, the stop members being in engagement.

Figure 19 is a fragmentary detail view of certain parts hidden in Figure 18.

Figure 1:
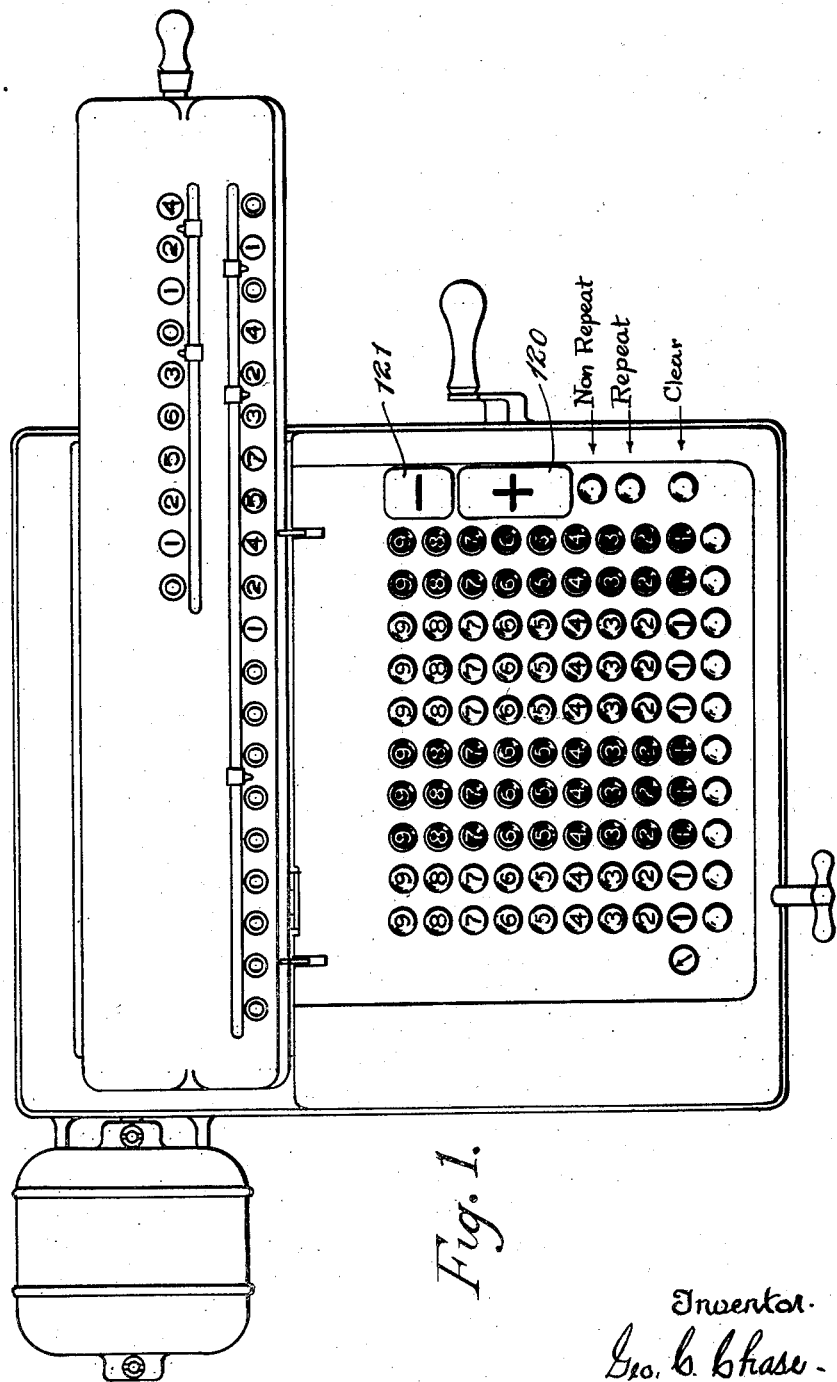
Figure 1 is a plan view of a calculating machine embodying the present invention.
Figure 17:
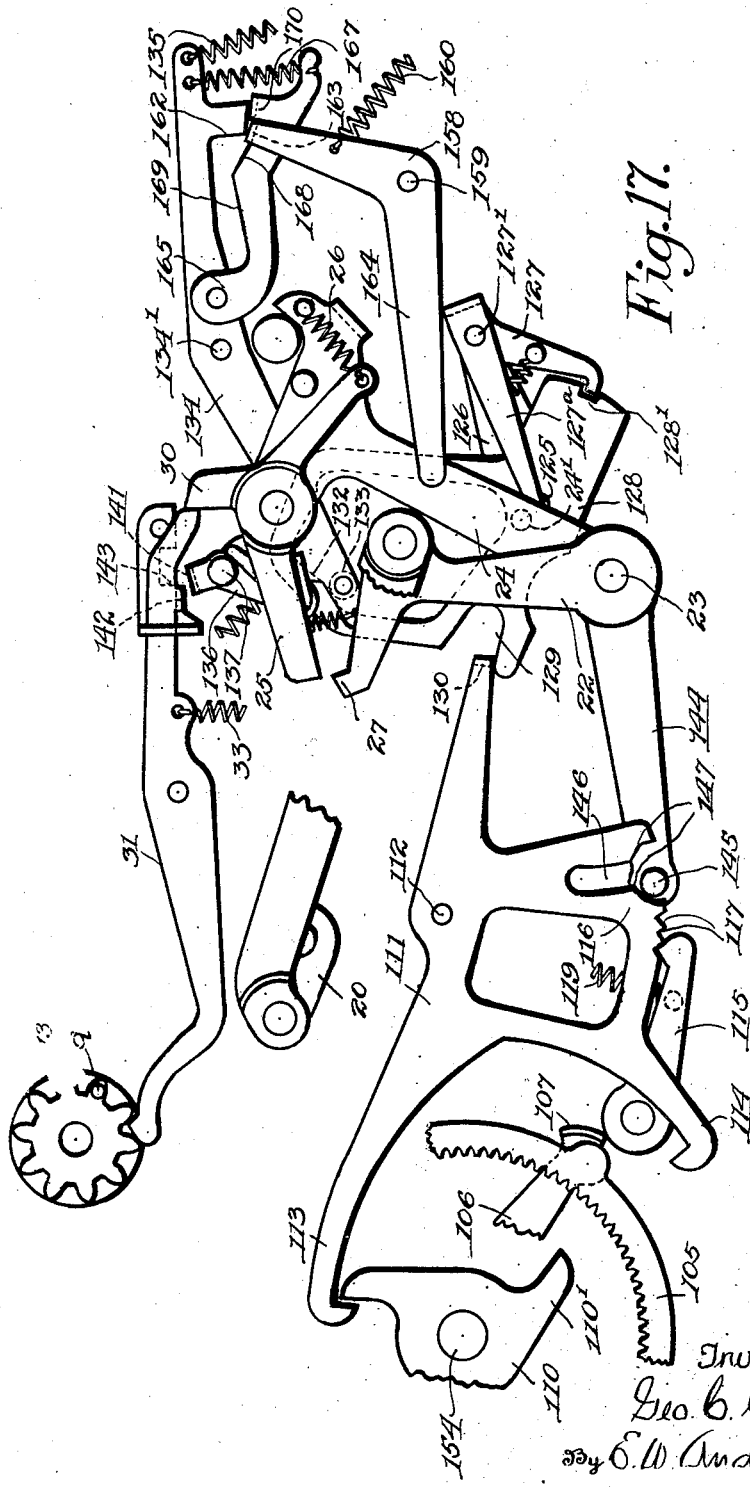
Figure 17 is a view similar to Figure 14, showing the position of the parts immediately succeeding depression of the subtract key.

Figures A, B and C are diagrammatic representations of three types of machines, distinguished by phases of the cycle of operation.

This invention relates to operating means for calculators, such, for instance, as the reversible calculators shown and described in the patent of E. F. Britten, Jr., No. 1,474,230, and application for patent of G. C. Chase, Serial No. 529,426, (full-cycle stop).

One object of this invention is to provide a calculating machine operable to perform addition, subtraction, multiplication or division by improved operating means which include a device operable to accomplish either result selectively by a single selective stroke. Said operating means may consist of an electric motor or any mechanical or manual driving device. Another object of the invention is to provide improved reversing mechanism, whereby the machine may be operated in a forward direction for positive calculations and in a backward direction for negative calculations. Another object is to provide suitable clutch mechanism, which will effect the engagement and release of the driving mechanism for the purpose of operating and stopping the machine. Another object is to provide suitable controlling devices for setting the clutch and reversing mechanism. Another object is to provide improved stopping mechanism, which will arrest the machine against overthrow by momentum when disengaged from the drive. Another object is to provide means for locating the driven mechanism of the machine in a normal position when brought to rest. Another object is to provide means whereby operation of a numeral wheel from 9 to 0 or from 0 to 9 by the highest order carrying mechanism shall stop the machine, and may serve to automatically determine quotient figure values. Other objects are to combine with each of the means stated in the above-named objects a reversible, manually operable crank, such for instance as shown in the before-named applications, so that either a motor drive or the hand drive may be used, optionally.

The invention consists in the novel construction and combination of parts, as hereinafter set forth.

In order that the nature of this invention may be made clear in its relation to the general art, it is desirable to consider a general classification of various types of numeral wheel actuating mechanism, and to point out the particular type in combination with which certain broad principles of this invention obtain patentable novelty.

All adding and calculating machines may be classified according to the various forms of mechanism which actuate the numeral wheels, as monophase or polyphase.

Monophase actuating mechanism is characterized by tens carrying actuators which operate simultaneously with the ordinal registering actuators. This structure permits a key value, usually 1 to 9, to be registered on the numeral wheel of the particular order, and a tens carry value from a numeral wheel of lower order to be simultaneously registered on the same wheel. Monophase actuating mechanism may be constructed to rotate in one direction only, or may be reversible for registering positive and negative values, or may be adapted to register positive and negative values by rotation in one direction only, according to the well known system of registering negative values complementally.

Polyphase actuating mechanism is characterized by tens carrying actuators which act out of phase with the ordinal registration actuators. In polyphase machines, a cycle of operation is therefore divided into two or more phases, a tens carrying phase being provided which is separate, and usually follows an ordinal registration phase of the cycle.

Polyphase actuating mechanism may be further classified in two subdivisions, polyphase non-reversible cycle and polyphase reversible cycle.

Non-reversible cycle machines may register positive values only, or may register both positive and negative values, either by reversing the numeral wheels or by registering negative values complementally. The cycle of operation of such machines is however not in itself reversible, since the succession of the phases of the cycle cannot be reversed. The well known Thomas type machine, patterned after the historic invention of Thomas de Colmar of France, in the year 1820, is a typical machine of this class.

Reversible cycle actuating mechanism relates solely to machines for registering both positive and negative values, and is characterized by the fact that the cycle of operation is in itself reversible, since the succession of the phases of the cycle may be reversed, and therefore special reversing mechanism, such as the reversing gears of the Thomas type machines, is not required. Reversible cycle machines employ a cycle of not less than three phases, a phase of ordinal registration in mid-cycle and a phase of tens carrying registration upon each side of the ordinal registration phase, the tens carrying phase which follows the ordinal registration alone being effective to register. The tens carrying mechanism related to each phase is designed to operate successively from the lower to the higher order numeral wheels in the respective direction of rotation. Machines of this class are in general patterned after the basic invention of Frank Stephen Baldwin, set forth in United States Patent No. 159,244, and are commonly known as Baldwin type machines.

In contrasting polyphase non-reversible cycle machines with polyphase reversible cycle machines, the following may be noted: In order to insure the proper succession of the phases in a non-reversible cycle machine employing reversible numeral wheels, with or without reversible actuating mechanism, special reversing mechanism, (usually reversing gears) is required, this mechanism being either manually or automatically controlled. A polyphase, non-reversible cycle machine, whether it has reversing mechanism or not, requires the provision of a controlling member (usually non-reversing) which prevents an interchange in the order of succession. In addition to this, if positive and negative registrations are to be performed, the non-reversible cycle machine must employ a switch, either manually or automatically operated, to reverse the numeral wheels or to change from and to complemental registration, this switch not being required in reversible cycle machines. Further, the tens carrying phase of the non-reversible cycle machines is in itself not reversible, as the tens carry must always occur from the lower order to the higher order numeral wheels, and not from higher order to lower order, as would be the case if the direction of operation of the tens carrying members were reversed. It is a peculiarity of the structure of these two types that the reversible cycle may be converted into a non-reversible cycle, switch reversing machine by a simple addition of parts, but that a non-reversible cycle machine, if it were to be converted into reversible cycle, would require such extensive alteration as to lose its original identity.

The three classifications herein set forth are illustrated diagrammatically in figures A, B and C of the drawings, wherein a circle of 360° is used to represent one cycle of operation, the starting and stopping point being shown at the top of the circle.

It is to be noted that the term cycle of operation is used herein to include the idle phase which precedes the ordinal actuation phase in either direction of operation, whereas in my co-pending application for patent Serial No. 529,426, it was found convenient to use the term as limited to the active phases.

The present invention is shown as applied to machines of the polyphase, reversible cycle type. Although this disclosure sets forth what is believed to be an advance in the field of reversible cycle calculators, there are many features of this invention which are adaptable to machines of other types.

In the accompanying drawings, illustrating the invention, the numeral 101 designates a drive shaft, which may be rotated continuously in one direction only or intermittently in one direction only. It is immaterial whether this shaft is rotated by mechanical means, electrically or otherwise driven, or whether it is manually operated. The invention includes in its preferable embodiment the use of a planetary gearing system which is well adapted for reversal of the drive of the machine and for the use of a clutch for starting and releasing the drive. In the drawings, the ratio of the gearing between the drive shaft 101 and the selecting elements and carry elements of the machine is six to one, in either direction of rotation, this ratio being subject to modification as may be required.

The sun gear 102 of the planet system is loosely mounted upon the carry shaft 154 of the machine, and is operatively connected with the drive shaft 101, planet gears 103 (two being shown) meshing with said sun gear and with annular, internally-toothed gear 105 of said system, the said planet gears being supported upon diametric arm 104, the latter being operatively connected to the carry shaft 154 and thereby serving to drive the machine, as will appear.

*Clutching and reversing mechanism.*

The annular gear 105 is supported by spider 106, which is mounted to rotate on diametric arm sleeve 104', the latter mounted in bearings of the frame structure and encircling and rotating independently of carry shaft 154. The gear 105 is provided with circumferential teeth 107 (addition clutch teeth), three of such teeth being shown, spaced apart from each other by arcs of 120°, and which are engaged by means to be stated for the purpose of locking the gear 105 against rotation whereby the actuating elements of the machine are caused to be rotated forwardly.

The machine being at rest and the drive shaft 101 rotating idly, the planet gears 103 will be caused by rotation of the sun gear to rotate on their own axes without movement of revolution around the sun gear, the diametric arm 104 thus remaining stationary and the annular gear 105 being rotated oppositely to the drive shaft 101. This is because the annular gear 105 is free to rotate, whereas the inertia and friction of the entire machine acts as a load upon the planetary gear carrying arm 104 to hold the same against rotation.

It being desired to rotate the machine forwardly, as in the performance of addition, the annular gear 105 is held against rotation by means to be described, whereby the rotation of the sun gear will cause the planet gears to revolve therearound inside of the annular gear 105, the arm 104 moving with the planet gears pivotally upon an axis coincident with that of the drive shaft.

Each of the planet gears carries a pinion 108 concentric therewith and meshing with a gear 109 (subtraction clutch gear), the latter being mounted to rotate upon a sleeve formed on sun gear 102 and carrying fast thereto the subtraction clutch member 110, having radial teeth 110'. The machine being at rest and the drive shaft 101 rotating idly, the subtraction clutch member 110 will be rotated in the same direction as the drive shaft, but at a lesser speed.

It being desired to drive the machine reversely, as in the performance of subtraction, the subtraction clutch member 110 is engaged and held stationary by a stop member to be described, thereby, through the rotation of the sun gear, acting upon the planet gears 103, causing the planet gear pinions to travel around the gear 109, the movement of revolution around the sun gear of the planet gears being in this case reverse to the movement thereof first described.

For the purpose of holding the ring gear 105 stationary in the performance of addition, or for holding the subtraction clutch member 110 stationary as in the performance of subtraction, one member only is used, namely the reversing clutch lever 111, pivoted to frame stud 112. This member may be slightly flexible, if desired, to reduce shock from inertia, although shown as a rigid member, sufficient flexibility being elsewhere provided. The reversing clutch lever 111 has at one end portion thereof upper and lower arms, 113 and 114 respectively, the upper arm 113 having engagement with the subtraction clutch member 110 to hold the same stationary; or the lower arm 114 engaging the teeth 107 of the annular gear 105, to hold the latter stationary, lever 111 forming the second member of the clutch in each instance. This lever has three positions, one in its clutch engagement with the member 105, the second in its clutch engagement with the member 110, and the third being a neutral position, as shown in Figure 3, wherein both members 105 and 110 are freely rotatable. A pawl device or click 115, pivoted at one end to the frame of the machine and engageable at its other or free end with any one of three notches 117, formed in the lower end of a downwardly extending arm 116 of lever 111 and so held by spring 119, is provided to hold said lever in either of said three positions thereof.

Upon movement of the reversing clutch lever to add or to subtract position the machine would be ordinarily at once rotated in one or the other direction, and the sudden strain thereby thrown upon the imperfectly engaged clutch would have a tendency to injuriously grind or wear the teeth thereof. To avoid this undue wearing or grinding away of said teeth, the sun gear 102 is loosely mounted upon the carry shaft 154, a clutch hub or collar fast upon the operating shaft 101 having a radial lug 101$^a$ which when the motor is running idly is held against one side of a radial bent lug 102$^a$ of the hub of the sun gear by coiled spring 101$^b$, having one end thereof secured to the drive shaft 101 and its other end to said bent lug 102$^a$.

When the clutch is engaged, and the sun gear encounters the load of the entire actuating mechanism of the machine, spring 101$^b$ will yield, allowing lug 101$^a$ to move through an arc of approximately 360°, to bring lug 101$^a$ into engagement with the other side of bent lug 102$^a$, establishing a positive drive.

As a result, when the reversing clutch lever is moved to add or to subtract position, the upper or lower arm of the reversing clutch lever will be first engaged with the teeth of the addition clutch member or of the subtraction clutch member, but the machine will not be thereby set into rotation, an interval of time sufficient for the lug 101$^a$ to move through an arc of approximately 360° to engage the other side of the bent lug 101$^a$ intervening before rotation of the machine is initiated, this interval being sufficient to admit of full engagement of the teeth of the upper or lower arm of the reversing clutch lever with the teeth of the addition clutch member or of the subtraction clutch member.

In the event that the add key or the subtract key is depressed to start a driving action of the machine during the time that the full-cycle stopping mechanism is operating to stop the machine as hereinafter set forth, there is a tendency toward confusion of operation, and the slight delay in picking up the drive of the machine resulting from the said drive delaying means, in addition to its function just stated also extends the time afforded for the full-cycle stopping mechanism to complete its operation before the drive of the machine is started, thereby avoiding this confusion. Therefore, because of the delay of the drive by the aforesaid means, other parts of the machine, provided to prevent the confusion set forth, may be timed to provide for an earlier setting of the clutch mechanism by the depression of the add or of the subtract key, following a stoppage of the machine, thereby permitting the machine to respond to more rapid operation of the add and subtract keys and speeding up the work.

Another advantage of the construction set forth is that the drive shaft 101 may be readily detached, as in changing electric motors. Still another advantage thereof is that it provides for slight eccentricity of the drive shaft 101 relative to the sun gear 102, as the latter must rotate concentrically upon carry shaft 154, thereby eliminating the need of perfect axial alignment of drive shaft 101 with said sun gear.

*Add and subtract keys.*

Means, now to be described, are provided to throw the reversing clutch lever 111 from its normal or neutral position into additive position upon depression of the add key 120, or into subtractive position upon depression of the subtract key 121.

The add key 120 and the substract key 121 are located at the right hand of the keyboard of the machine, as shown in the plan view, Figure 1. The stems of these keys pass through the keyboard plate and are supported in slots of bent lugs 122′ of bracket 122, suitable means as shown being provided to limit the upward and downward movements of the keys and spring being provided to normally retain the keys in raised position.

Means are provided whereby a rock shaft 125 will be rotated or rocked to one side or the other by depression of the add or of the subtract key, and consisting of two links 123, pivoted at their outer ends respectively by studs 120′ and 121′ to the stems of the add and of the subtract keys, and at their inner ends pivoted together by stud 123′, the latter being embraced by slot 124′ of the upper end of rock lever 124, fast upon rock shaft 125, extending transversely of the machine. Upon depression of the add key the rock lever 124 is rocked rearwardly, the subtract key on the other hand in its depression rocking said lever forwardly.

In order that both the add and the subtract keys may be prevented from being depressed simultaneously, a stationary ridge or tooth 122$^a$ underlies the pivot stud 123′ and contacts therewith and blocks the resultant movement of said stud that would be consequent upon the simultaneous depression of both of the keys. In the separate operation of said keys, the stud 123′ takes a path of movement to one side or the other, parallel to one or the other of the inclined edges of said ridge or tooth.

Means are provided whereby the add or subtract keys are prevented from being depressed during an operative portion of the cycle of movement of the machine, said means being adapted to permit either key to be held down after depression thereof but upon release of the key preventing the depression of either key until the operative cycle initiated by the depression of the key has been completed.

For this purpose pawls 121$^a$, one for each key, are pivoted intermediately of their ends to bracket 122, the springs 122$^b$ thereof impelling the ends 122$^c$ of the lower arms of said pawls against cam 122$^d$, the latter rotating on the same axis as that of the crank handle gear 76 and being driven by said gear, through engagement of pin 122$^e$ thereof with one or the other of the opposite faces 76' of a slot of the hub of the gear 76, the other arms of the pawls being adapted to move beneath lugs 120$^b$ and 121$^b$ of the stems of the add and subtract keys. The aforesaid slot is of width to space its opposite faces 76' sufficiently apart to allow a limited amount of lost motion of the gear 76 in either direction before it engages said pin to rotate the cam, for a reason to be now explained.

Whenever the machine is in normal or full-cycle position, the cam 122$^d$ is in position holding said arms of lock pawls 121$^a$ from beneath said key stem lugs. Upon rotation of the machine from normal or full-cycle position, and the cam 122$^d$ rotating, either of said pawls is permitted to move beneath the related key stem lug, if the latter is in its raised position, thereby locking the key in its elevated position, the lost motion allowed cam pin 122$^e$ before it has contact with either face 76' of said slot providing that the keys shall not be locked in raised position until the registering operation is started and that they shall not be released until the registering operation is finished, and that both keys shall be always unlocked whenever the machine is in its normal or full-cycle position.

The rock shaft 125 rotates in bearings of the framing and at the left end thereof is provided with an arm 126, fast thereto and having at its free end stud 127' whereon is pivotally mounted pawl 127 (coupling pawl). Setting lever 128 rotates loosely upon the rock shaft 125, but is normally locked to move with said rock shaft by engagement of the free end of said coupling pawl with a notch 128' of said lever. Therefore upon depression of the add key, the rear end of the setting lever will be moved downwardly, and when the subtract key is operated said lever is moved upwardly, said rear end of the setting lever having an open-end slot 129 embracing a projection 130 of the reversing clutch lever 111 and thereby operating the latter. Normally the projection 130 is located midway between the sides of the slot 129 of the setting lever, said slot having a width sufficient to provide that the said projection 130 shall be engaged to move the reversing clutch lever 111 only during the final portion of the operation of the add or of the subtract key, the reason for this being hereinafter explained.

The reversing clutch lever will be oppositely actuated by the operation of the add and subtract keys, to cause in the one case one arm (addition clutch arm) thereof to engage with one of the addition clutch teeth 107, thereby setting the machine in rotation forwardly, and in the other case causing the other arm (subtraction clutch arm) thereof to engage with one of the teeth 110' of the subtraction clutch member 110, thereby setting the machine in operation reversely.

*Means for releasing the drive.*

Having described the means whereby the working devices of the machine are rotated forwardly or reversely, it now becomes necessary to describe means whereby a release of the working devices may be effected and the same stopped at the end of any cycle of operation, i. e., at the conclusion of any additive or subtractive registration.

Reviewing briefly the features of the co-pending Chase application Serial No. 529,426, for full-cycle stop for calculating machines, attention is first directed to Figure 2 of the said application and to Figure 3 of the present application, wherein like parts are numbered alike.

The crank arm 20 is fast upon a drive shaft of the machine and rotates once completely in a counter-clockwise direction during an additive registration, and once completely in a clockwise direction during a subtractive registration. The link connection between the crank 20 and the rock lever 22 oscillates the latter to precisely the same extent in both addition and subtraction. The lever 31 is tripped by the pin $q$ of a numeral wheel 13 in the carry movement of the latter, and releases the stop element 25, which, through its spring 26, is then moved into position for engagement with the free end 27 of rock lever 22. The stop element 25 being so released and engaged by said rock lever, the rotation of the crank arm 20 from its normal dead center position causes the arm 24, upon which part 25 is pivotally mounted, to be moved forwardly upon its pivot 23 until it is arrested by engagement with the cushion 29' of stop 29. During the pivotal movement of the arm 24 the spring or springs 28 of said arm will become tensioned and will retard the movement of the parts and reduce the vibration consequent upon contact of the arm 24 with said stop, at which time the crank arm 20 will be checked in additive full-cycle position, as shown by full lines in Figure 3 of said co-pending application, or in the subtractive full-cycle position, as shown by the dotted lines in the same figure, according to the direction of rotation of the calculating devices.

This full-cycle stop mechanism operates in response to certain movements of the numeral wheels 13 hereinafter more fully set forth under the heading of Operations involving a transitional carry.

Figure 20:
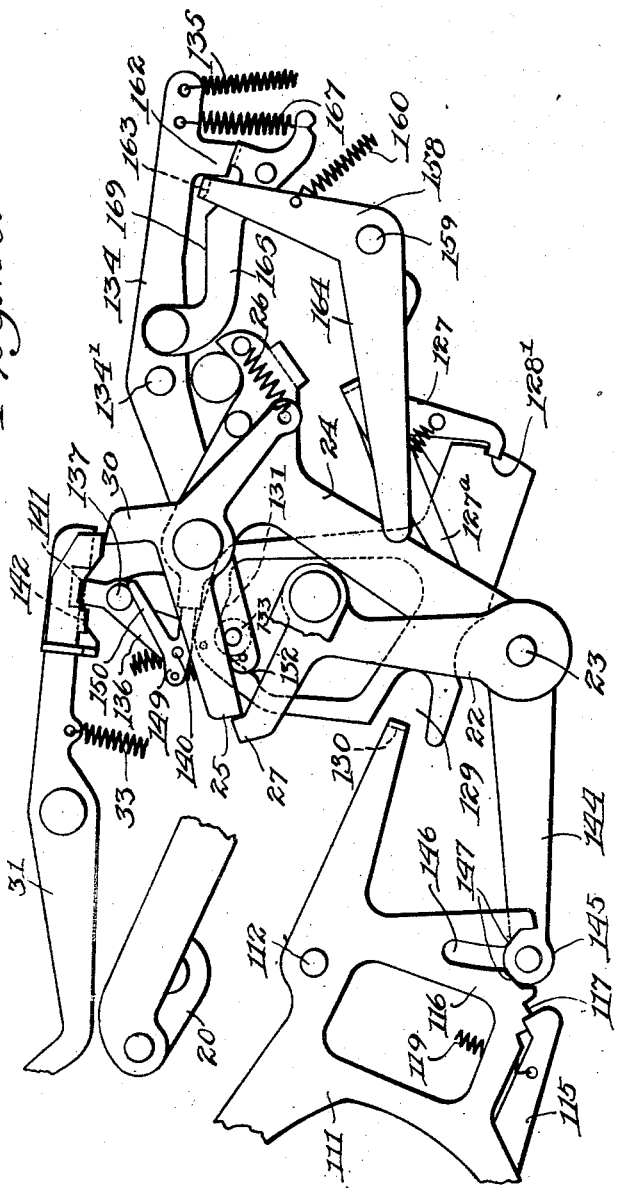
Figure 20 is a view similar to Figure 18, showing the position of the parts during the rebound of the actuating mechanism succeeding engagement of the stop members.

In the present machine, upon release of the add key 120 or the subtract key 121 it becomes necessary to release the drive and to stop the working of the machine as stated, and this same full-cycle stop mechanism is available, if means be provided for tripping the lever 31 in the same manner that it is tripped by the pins $q$ of the numeral wheels 13. For this purpose the setting lever 128 (see Figures 14 and 20) has a cam edge 131 (adding cam edge) used in performing positive operations, and a cam edge 132 (subtracting cam edge) used in performing negative operations, either of which edges may in the actuation of said setting lever depress a roller 133 mounted upon one end of a releasing lever 134, pivoted at 134' to the framing. The releasing lever has at the rear end thereof stud 137, whereon is pivotally mounted pawl 136 (releasing pawl), the latter having stud 140 whereon is pivotally mounted pawl 149 (restoring pawl), spring 138 connecting an arm of the releasing lever with an arm of the restoring pawl and operating both of said pawls, impelling the arm 150 of the restoring pawl against stud 137 as a stop therefor, and impelling the enlarged head of stud 140 against stopping edge 139 of the releasing lever as a stop for the releasing pawl 136. The function of the restoring pawl 149 will be hereinafter explained.

Upon depression of the releasing lever 134, consequent upon depression of the add key or of the subtract key, the lug 141 of the pawl 136 of said lever will be depressed to a position lower than lug 142 of lever 31 and lug 143 of the framing, said pawl thereupon being pivotally moved by spring 138 to bring the lug 141 to a position beneath lugs 142 and 143, the enlarged head of stud 140 then contacting with stop edge 139 to limit the pawl movement in this direction.

Upon release of the add key or of the subtract key as the case may be, the releasing lever 134 will be moved upwardly by its spring, aided by frictional latch spring 167 as will be hereinafter explained, these springs being superior to the spring 33 of lever 31, until the lug 141 contacts with stop lug 143, the movement of the pawl 136 with said lever (owing to contact of lug 141 with lug 142) tripping the lever 31 and releasing the stop element 25, preliminary to stopping the machine at full-cycle position, the operation of the full-cycle stop being otherwise as stated in said co-pending application.

In the normal position of the parts, lug 141 is in front of the vertical edge of stop lug 143, the function of this stop lug being first to prevent lug 141 from passing beneath lug 142 at such times as lever 31 is tripped by pins $q$ during hand operation of the machine, at which time lug 141 is not moved downwardly; and secondly to provide that lug 141 will not raise lug 142 an excess distance under normal motor drive operation.

It is now necessary to provide means for releasing the calculating mechanism from the action of the motor drive before the stop is effected, or before the arm 24 contacts with the stop 29'. This release from the driving means is effected by the restoration of the reversing clutch lever 111 to normal position, as will now be explained.

The arm 24 is provided with an extension 144 on the opposite side of its pivot, said extension having at its free end a stud 145 engaging a slot in the downward extension 116 of reversing clutch lever 111, said slot having opposite lateral cam edges 147, converging upwardly, and an upper contracted portion 146. As the arm 24 is moved in the sequence of operations following any tripping of the lever 31, the stud 145 of extension 144 will engage one or the other of the cam edges 147, according to whether said lever stands in addition clutch position or substraction clutch position, and will immediately move the lever 111 back to normal position, thereby allowing the calculating mechanism to come to rest, with the motor running idly, as hereinbefore explained.

*Limiting the rebound.*

As the arm 24 contacts with the stop 29 there will be a rebound of the mechanism, made greater by the action of the springs 28, which rebound, while negligible in the case of the manually operated machine, is liable in the use of a motor drive to be such that it will throw the rotary calculating members out of the full-cycle zone. Means for controlling the rebound are therefore provided as follows:

The arm 24 of the full-cycle stop mechanism is provided at its upper end with a projection 151, normally abutting against the end of forward arm 152 of the restoring pawl 149. Upon depression of the rear arm of the releasing lever 134 consequent upon depression of the add key or of the subtract key, the releasing pawl 136 and the restoring pawl 149 will move downwardly therewith and the forward arm 152 of the restoring pawl will move downwardly past the projection 151 of the arm 24, the spring 138 then acting to move the releasing pawl pivotally beneath the lug 142 and to move the restoring pawl bodily to bring its forward arm 152 beneath said projection 151, the enlarged head of the stud 140 then contacting with stop edge 139 to limit the pawl movement in this direction. Upon release of the add key or of the subtract key, the rear arm of the releasing lever will be moved upwardly, and the releasing pawl and the restoring pawl moving upwardly therewith, the restoring pawl will be moved pivotally through engagement of its arm 152 with projection 151 of the arm 24, and the lug 141 of the releasing pawl will engage lug 142 of the lever 31 and thereby move and trip said lever, said lug 141 at the end of the movement contacting with the frame lug 143 and the lever 31 being held tripped. In the tripping of the lever 31 the stop element 25 will be released and the arm 24 will be operated preliminary to stopping the machine at full cycle position, and said arm 24 moving away from restoring pawl 149, the projection 151 of said arm will be disengaged from the rear arm 152 of said pawl, which will be returned to normal position through its spring 138, and in such position will be engaged by the projection 151 of said arm 24 in the return movement of the latter after lug 30 of part 25 passes beneath the raised forward end of lever 31. As a consequence, the restoring pawl will be moved bodily, and the releasing pawl will be moved pivotally against the tension of its spring 138, to disengage its upper end lug 141 from beneath the lug 142 of lever 31 and from beneath frame lug 143, thereby permitting the forward end of lever 31 to fall upon lug 30 of stop element 25, and the spring of the releasing lever acting to raise the rear arm thereof a further step, to bring its upper end lug 141 in front of the frame lug 143 and in front of the lug 142 of the lever 31.

The rebound of the parts continuing until crank arm 20 has passed through dead-center position, stop element 25, still engaged with the rock lever 22, will cause arm 24 to be moved again toward the stop 29, the lug 30 now escaping from beneath the lever 31, which latter will be returned by its spring to normal position. In said movement of the parts the spring 28 will become tensioned and may check the rebound within this full-cycle stop position, but if it does not, the second operation of the stop, provided for as above set forth, will prevent the parts from passing out of full-cycle position.

It being understood that this rebound causes the parts to be moved past normal position, and is checked by the spring 28 or by the means described, the spring 28 will in either case return the parts to normal position, when lug 30 will engage the forward end of lever 31 and the stop element 25 will be raised from engagement with the free end 27 of rock lever 22.

Means are also provided which will insure the checking of the movement before full-cycle position is reached upon a second rebound. As the momentum of the parts in this final rebound is comparatively slight, simple spring means may be used to check it. A cam 153 is fast upon the right-hand end of the carry shaft 154, the latter being geared in one-to-one ratio with the driving mechanism of the machine, and a lever 155 is mounted at one end thereof on the frame and at its other end has a spring 156 acting to hold roller 157 (located intermediately of the lever) in contact with the cam. This roller is in engagement with a middle depression or innermost point of the cam when the parts are in normal position.

As the carry shaft rotates in either direction in the operation of the machine the parts will be moved from normal towards full-cycle position and the roller 157 will climb one or the other side of the cam, against the resistance of the spring 156, which resistance is sufficient to check this movement of the parts upon the final rebound. The spring 156, of course, will also in its action absorb some of the energy of the first rebound, thereby decreasing the energy of the second rebound.

*Counterbalance for the carry arms.*

The carry shaft 154 is provided with a series of stepped carry arms, as shown in Figure 6, these carry arms being functionally equivalent to those described in the above-mentioned application 426,043. The weight of these carry arms is thrown upon one or the other side of the axis of the carry shaft in the operation of the machine. In order to counterbalance the weight of these carry arms a cam would be theoretically shaped as in Figure 12, being adapted to cause the roller 157 to climb the cam whenever said carry arms are falling and assisted by the force of gravity, and to cause said roller to fall toward the center of the cam whenever said carry arms are being raised against the force of gravity. As practically applied in this machine, the cam 153 for checking the second rebound has been suitably modified to provide this counterbalancing action, being shaped as in Figure 13.

In laying out the curve of the cam 153 the following three factors are taken into consideration, namely, first the counterbalancing of the eccentric weight of the carry arms; second, the variation of the spring tension on the roller 157 as it travels from the lowest to the highest point of the cam and vice versa, to thereby maintain a perfect balance throughout a complete rotation, and third, the checking of the second rebound as just described to stop or locate the operating means of the machine in normal position.

Counterweights are commonly used for counterbalancing purposes, but are objectionable, especially in the case of a motor-drive machine, in that they acquire too much inertia of motion.

*Provision for quick-stroke operation.*

In view of the fact that the driving mechanism of the machine may stand normally anywhere between the two extreme full-cycle positions, the crank arm 20 may be so located at the time the add key or the subtract key is depressed that it will move an appreciable distance through the full-cycle zone before coming to dead-center position, during which movement, if the key were released by the operator, stop element 25 would drop into engagement with rock lever 22 and would bring about a stoppage of the machine before the operative cycle had started.

To avoid this objectionable result, a bell lever 158 (quick stroke latch lever) is fulcrumed to the left side of the framing at 159, and the forward end of the releasing lever 134 is provided with a tooth 162, a lug 163 upon the upper end of the lever 158 normally engaging the vertical edge of said tooth and being so held by spring 160. Upon depression of the add key or the subtract key and consequent operation of the releasing lever 134, the tooth 162 will rise above said lug, the latter thereupon being moved beneath the lower edge of said tooth by spring 160, until stopped by pin 161, the lever 158 now acting to hold the releasing lever 134 against retractive or return movement, in case of the release of the key, so that lever 31 will not be tripped at this time.

As the rock lever 22 reaches its extreme forward position during an adding or a subtracting registration, the lower arm 164 of the bell lever 158 (quick stroke latch lever) is engaged thereby and said lever is actuated to withdraw the lug 163 thereof from beneath tooth 162 of the releasing lever and drive said lug against inclined or cam edge 168 of latch 165 (frictional latch), thereby moving said latch downwardly and tensioning latch spring 167 and withdrawing the stop lug 170 of said latch slightly from the lower edge of the tooth 162, the continued movement of the lever 158 causing the lug 163 thereof to engage reversely inclined edge 169 of said latch, this spring-tensioned frictional engagement holding the lever 158 against return movement. As a result of this holding inoperative of the bell lever 158, it is prevented from reengaging beneath the lower edge of tooth 162 of the releasing lever, which would have the objectionable result of preventing the lever 134 from being retracted, thereby preventing the stoppage of the machine at the proper time.

Therefore the bell lever (quick stroke latch lever) 158, by holding the releasing lever 134 in operated position, insures that the operative cycle of the machine shall be completed, said lever 158 being then rendered inoperative by being withdrawn and frictionally held as stated, until the add key or the subtract key is released.

The tensioning of the latch spring 167 (frictional latch spring) as stated provides spring power to aid releasing lever spring 135 to operate releasing lever 134, upon release of the add key or the subtract key, to trip the lever 31 as hereinbefore stated. By this means energy from the driving motor is utilized to restore the releasing lever 134 and unlatch the lever 31, permitting the spring 135 of the releasing lever to be very light, and thereby lightening the action or touch of the add and subtract keys. It is to be noted here that the action of these springs 167 and 135 tends also to centralize the setting lever 128, through the action of the roller 133 of the releasing lever.

It has been previously explained that upon release of the key, the consequent rise of the rear end of the releasing lever will cause the bent upper end lug 141 of the pawl 136 to engage the lower edge of frame lug 143 as a stop, and in the consequent depression of the forward end of the releasing lever the tooth 162 thereof will not fall sufficiently to quite touch stop lug 170 of the pawl 165, thereby maintaining the frictional engagement of said pawl with the lug 163 of bell lever 158, so that the latter will not be returned to normal position until the releasing lever 134 is returned to normal position, the last named action taking place as previously explained and bringing about a location of said upper end lug 141 of pawl 136 in front of the frame lug 143. If the bell lever 158 (quick stroke latch lever) were released too soon, the spring 33 might overpower the spring 135 of the releasing lever and allow the forward end of lever 31 to move downward too soon, thereby losing the stop for the first rebound, previously explained.

*Operations involving a transitional carry.*

In machines of the present type positive totals are registered normally, whereas negative totals are registered as complementary numbers. For example, if the numeral wheels stand at zero and 6 is added as a positive number, 6 will be registered on a numeral wheel. On the other hand, if 6 is subtracted, the units numeral wheel will register 4 and all higher numeral wheels will register 9 as far as the carry mechanism will operate. The effect of the subtraction of 1 from successive higher orders, ad infinitum, is that a carry will be lost. Conversely, after a negative registration, as for instance with the units wheel standing at 4 and 999 in the higher wheels, a positive registration succeeding, as for instance if 8 were added, a forward carry action would occur, the numeral wheels changing from negative to positive value registration and showing 2 in the units wheel, with all of the higher wheels registering 0. Here again a carry registration is lost between the higher order numeral wheels.

Both of the above-stated examples, one involving a change from positive to negative value and the other a change from negative to positive value, are herein termed transitional carry operations. Whenever such an operation occurs in this machine the lever 31 is tripped by the pin $q$ or the pin 45, as explained in the before-mentioned co-pending application, and the full-cycle stop mechanism is brought into operation, the operation of the machine being concluded at this time even though the operator maintain finger pressure on the add or the subtract key, and requiring that the key be released and again depressed if it is desired to continue the operation of the machine in the same direction.

In order that the operation of the machine shall be so concluded at this time, the following means are provided:

Coupling pawl 127 is provided with an arm 127$^a$, the free end of which lies normally adjacent the left-hand end of rock shaft 125 and so remains during the depression of the add or subtract key. Upon forward movement of the arm 24 of the full-cycle stop means aforesaid, pin 24' thereof engages said arm 127$^a$ of the coupling pawl, and simultaneously stud 145 thereof acts to centralize reversing clutch lever 111, which in turn slightly moves setting lever 128 toward its centralized position, this in turn moving coupling pawl therewith and imparting a very slight upward movement to the add or subtract key against pressure of the finger of the operator, withdrawing of the coupling pawl 127 from notch 128' of the setting lever immediately following and the partially raised key being released and being free to resume its fully depressed position under finger pressure. The machine automatically stops at this time however, and the slight upward kick given the key serves as a signal for the release thereof. The coupling pawl being withdrawn as stated from the notch of the setting lever, the latter is at once released and returned to normal centralized position, spring 128$^a$, 135 and 167 contributing to this end, and the full-cycle stopping mechanism bringing the machine to rest, as will be obvious.

The restoration of the add or of the subtract key to normal position by its spring serves, through the connecting parts, to centralize the coupling pawl, so that it may again engage notch 128' of setting lever 128, whereupon the mechanism is ready to operate in response to another stroke of the add or subtract key. Whenever arm 24 operates add and subtract keys being previously released and in normal position, coupling pawl 127 merely moves out of and back into engagement with notch 128' of the setting lever.

The arrest of the operation of the machine in response to a transitional carrying operation serves several purposes, as will be described under heading Operation.

*Yieldable drive member.*

In the event that the operating mechanism of the machine becomes locked in any manner to thereby lock the carry shaft 154 against rotation, the following clip clutch means will avoid damage to any of the mechanism, and serves also as a shock absorber to provide for a slight slippage whenever the machine is suddenly started or brought to a stop, thereby greatly relieving the strain on the mechanism and providing a smoother and quieter operating machine.

Planetary gears 103 and planetary pinions 108 are carried around the axis of carry shaft 154 upon diametric arm 104, fast to sleeve 104', the latter upon the left-hand end of said carry shaft and passing through the left side frame of the machine. The opposite end of this sleeve has a diametric arm 181, provided at its free ends with perforations within which fit lugs 182 of the driving friction disk 177, whereby the sleeve and said disk have fast connection to rotate with each other. The driving friction disk 177 is pressed against driven friction disk 178 by spring 179 mounted upon the carry shaft 154, a washer 180 and a cross-pin 180' of said shaft limiting the movement of said spring outwardly from the friction disks. The driven friction disk 178 is formed as an enlarged integral part of the extreme left-hand carry arm of the machine, said carry arm in earlier applications herein referred to serving merely as a support for the carry dogs $j$.

The tension of the spring 179 is adjustable to vary the frictional engagement of the two disks 177 and 178, by means of cams 183 and 184 upon the driving disk 177, against which bear the free ends of the spring 179, the cam 184 having a series of notches 185 and the related end of the spring 179 having a tooth 186 adapted to snap into any one of said notches, the said adjustment being accomplished by withdrawing the tooth 186 from one of the notches 185 and moving said spring pivotally upon the carry shaft 154 to engage any other of said notches.

While normally operable by the motor drive connection with the carry shaft, as has been stated, it will be noted that the machine herein described is adapted for the retention of the reversible, manually operable crank of the earlier machines, of this type, as an optional operating device. The present invention requires no setting means adjustable preliminary to operation of the reversible crank or of the add key or subtract key.

Operation.

Manipulation of the add key or the subtract key provides for the operation of the machine in the performance of any arithmetical calculation based on addition, subtraction, multiplication, division or developments of these fundamental operations, such as square roots, cube roots, etc. These keys are depressed and immediately released for single cycle operations such as addition and subtraction. For multiple cycle operations such as multiplication and division, etc., the proper key may be held depressed for several cycles. The operation may be the same as with a hand crank machine, except that the depression of the add key and the subtract key is substituted for forward and backward crank rotation respectively, and except that in division the automatic stopping of the machine in response to a transitional carry provides for the automatic determination of quotient digits. In performing the latter operation, with the dividend on numeral wheels 13 and the divisor properly placed on the keyboard, depress the subtract key and hold it until the machine stops. Then touch the add key for on additive cycle, upon the completion of which the machine again stops, whether the key is released or not. Then shift the carriage one space to the left and repeat the operation for the next quotient digit, etc. Obviously, division may also be accomplished as in hand operation, by the estimating method, the subtract key being released after a number of cycles of operation which will leave the remainder less than the divisor. In actual practice it is of advantage to combine the two methods of operation, such quotient figures as may readily be estimated being registered by the corresponding method, and those which are not instantly apparent to the operator being determined automatically; whereby each quotient figure is registered with the least loss of time, and the individual capacity of the operator, whatever that may be, is fully utilized. The stopping of the machine in response to a transitional carry is also of value in operations other than division, as it may serve as a signal to show that the capacity of the machine has been exceeded.

The use of two keys, the add key for positive operations and the subtract key for negative operations, is of great advantage, being equivalent as to result attained to the use of the reversible, manually operable crank of the said earlier machines, it being possible by the use of these keys to change from positive to negative operations and vice versa without manipulating any setting means whatever, which is especially desirable in the well-known multiplication short cuts, where products are obtained by a combination of positive and negative calculations.

I claim:—

1. In a calculating machine, reversible numeral wheels, actuating means therefor having a reversible cycle of operation, driving means including a motor, and clutch means operable to initiate and effect transmission of movement from said motor directly from said clutch to a reversible member of said actuating means.

2. In a calculating machine, reversible numeral wheels, actuating means therefor having a reversible cycle of operation, driving means including a motor, and transmission mechanism between said motor and said actuating means, including a rotary clutch and reversing unit operable by a single manual stroke to determine and initiate forward or reverse movement of said actuating means.

3. In a calculating machine, reversible numeral wheels, actuating means therefor having a reversible cycle of operation and including differential selecting members, driving means including a motor and transmission mechanism between said motor and said differential members, including a rotary clutch and reversing unit operable by a single manual stroke to determine and initiate forward or reverse movement of said actuating means.

4. In a calculating machine, reversible numeral wheels, actuating means therefor having a reversible cycle of operation, driving means including a motor, clutch means operable to effect transmission of movement from said driving means to said actuating means, and cushion means directly operable upon said reversible actuating means to check the momentum thereof when said clutch is released.

5. In a calculating machine, the combination with reversible numeral wheels, selecting mechanism, means for registering upon said numeral wheels amounts set up by said selecting mechanism, including having a reversible cycle of operation, and driving means including a motor, of means for dividing an amount registered upon said wheels by an amount set up by said selecting mechanism, including means controlled by the numeral wheels for automatically stopping the machine to determine a quotient figure.

6. In a calculating machine, the combination with reversible numeral wheels, selecting mechanism, means for registering upon said numeral wheels amounts set up by said selecting mechanism, including an operating device, and actuators having a reversible cycle of operation, and means cooperating with said registering means to register a quotient figure and a remainder by a single continuous operation of the machine through a number of cycles, said operating device being selectively manipulable to determine said number, of alternative means for automatically determining said quotient figure upon passage of said numeral wheels from positive to negative registration.

7. In a calculating machine, the combination with reversible numeral wheels, selecting mechanism, means for registering upon said numeral wheels amounts set up by said selecting mechanism, including an operating device and actuators having a reversible cycle of operation, and means cooperating with said registering means to register a quotient figure and a remainder by a single continuous operation of the machine through a number of cycles, including stop means operable upon manual release of said operating device, of alternative means for determining the registration of said quotient figure, including a stop controlling device operable independently of the release of the operating device.

8. In a calculating machine, numeral wheels, reversible actuating means therefor comprising rotary elements, motor-driven means for operating said actuating means in either direction comprising transmission means and means for controlling the action of said actuating means, said last-named means having a direction of movement invariable with relation to the cycle of movement of the actuating means and including an oscillatory member, driven by one of said rotary elements, and alternative rotary hand operating means for said actuating means, independent of said motor-driven means.

9. In a calculating machine, numeral wheels, means adapted to actuate said wheels to register positive or negative values, a device selectively operable to determine a positive or a negative registration and to initiate the actuation, and means to determine the number of cycles of operation and to stop the actuating means in full-cycle position by manual release of the operating device.

10. In a calculating machine, reversible numeral wheels, reversible rotary actuating means therefor having an invariably timed cycle of operation, driving means including a motor, transmission means between said motor and said actuating means, and means selectively operable by a single manual stroke to determine and initiate forward or reverse transmission and to determine the number of cycles of forward or reverse operation.

11. In a calculating machine, reversible numeral wheels, reversible rotary actuating means therefor having an invariably timed cycle of operation, driving means including a motor, transmission means between said motor and said actuating means, means selectively operable by a single manual stroke to determine and initiate forward or reverse transmission and to determine the number of cycles of forward or reverse operation, and alternative hand operating means for the machine, including a crank handle adapted for operative connection with said actuating means.

12. In a calculating machine, numeral wheels, means adapted to actuate said wheels to register positive or negative values, one-way driving means for said actuating means, and manually adjustable means acting to establish a driving connection with the actuating means and to correlate the members of the driving and actuating means to effect positive or negative actuation of said wheels during a plurality of cycles of operation, including an operating device adapted for a single selective operation to accomplish both functions.

13. In a calculating machine, numeral wheels adapted to register positive or negative values, actuating means therefor, full-cycle stop means for said actuating means including a member provided with a shoulder, a member movable into the path of said shoulder, manually operable freely retractable positive and negative operation keys, and means adapted to hold the movable member out of contacting position until the positive or the negative value key is released.

14. In a calculating machine, numeral wheels adapted to register positive or negative values, actuating means therefor, full-cycle stop means including a member having fixed driving connection with said actuating means and provided with a shoulder, a spring-tensioned member adapted to move into contact with said first-named member and into engagement with the shoulder thereof at a point in its movement corresponding to the operative full-cycle position of the actuating means, and manually operable freely retractable positive and negative operation keys having connection with said spring-tensioned member and each adapted to hold the same out of contacting position until the key is released.

15. In a calculating machine, reversible numeral wheels, reversible actuating mechanism therefor, a continuously running motor, a clutching and reversing transmission mechanism between said motor and said actuating means, and means operable by a single selective manual stroke to determine and effect forward or reverse operation of said transmission mechanism continuously throughout any selected number of cycles of operation.

16. In a calculating machine, reversible numeral wheels, reversible actuating mechanism therefor, driving mechanism including a member rotating continuously in one direction, transmission mechanism between said driving member and said actuating means, and means operable by a single selective manual stroke to determine and effect forward or reverse operation of said transmission mechanism continuously throughout one or more cycles of operation.

17. In a calculating machine, reversible numeral wheels, reversible actuating mechanism therefor including differential selecting members, driving mechanism including a member rotating continuously in one direction, transmission mechanism between said driving member and said differential members, and means operable by a single selective manual stroke to determine and effect forward or reverse operation of said transmission mechanism continuously throughout one or more cycles of operation.

18. In a calculating machine, reversible numeral wheels, reversible actuating mechanism therefor, a driving member operating in one direction only, transmission mechanism between said driving member and said actuating means including a gear, and means operable by a single selective manual stroke to control the action of said gear and thereby determine and effect forward or reverse transmission continuously throughout one or more cycles of operation.

19. In a calculating machine, reversible numeral wheels, reversible actuating mechanism therefor, a continuously running motor, a clutching and reversing transmission mechanism, and means including a plurality of manually operable members and a pivoted clutch and direction control member common thereto, operable by a single selective manual stroke to control said transmission mechanism and thereby initiate and effect forward or reverse actuation of said wheels.

20. In a calculating machine, reversible numeral wheels, reversible actuating mechanism therefor including differential selecting members, a continuously running motor, a clutching and reversing transmission mechanism between said motor and said actuating mechanism, and means including a plurality of manually operable members and a pivoted control member common thereto, operable by a single selective manual stroke to control said transmission mechanism and thereby initiate and effect forward or reverse actuation of said wheels.

21. In a calculating machine, reversible numeral wheels, reversible actuating mechanism therefor, a continuously running motor, a clutching and reversing transmission mechanism, and means including a plurality of manually operable members and a pivoted clutch and direction control member common thereto, operable by a single selective manual stroke to control said transmission mechanism and thereby initiate and effect forward or reverse actuation of said wheels through one or more cycles of operation.

22. In a calculating machine, reversible numeral wheels, reversible actuating mechanism therefor including differential selecting members, a continuously running motor, a clutching and reversing transmission mechanism between said motor and said actuating mechanism, and means including a plurality of manually operable members and a pivoted control member common thereto, operable by a single selective manual stroke to control said transmission mechanism and thereby initiate and effect forward or reverse actuation of said wheels through one or more cycles of operation.

23. In a calculating machine, reversible numeral wheels, actuating means therefor, driving means including a motor, clutch means operable to initiate and effect transmission of movement from said motor forwardly or reversely to said actuating means, including a selectively settable member, and means operable by a single selective manual stroke to set said member and to determine the number of cycles of operation.

24. In a calculating machine, reversible numeral wheels, actuating means therefor, driving means including a motor, clutch means operable to initiate and effect transmission of movement from said motor forwardly or reversely to said actuating means, including a selectively settable member, a key operable to set said member for forward rotation, a key operable to set said member for reverse rotation, and means operable to release the clutch upon manual release of either key.

25. In a calculating machine, reversible numeral wheels, reversible actuating means therefor, driving means including a motor, operating means including a forward rotation key and a reverse rotation key, and clutch means engaged to transmit movement from said motor forwardly or reversely to said actuating means by the depression of either the forward rotation key or the reverse rotation key and adapted in normal operation to remain engaged so long as either key is held depressed.

26. In a calculating machine, reversible numeral wheels, reversible actuating means therefor, driving means including a motor, clutch means operable to initiate and effect transmission of movement from said motor forwardly or reversely to said actuating means, a key operable to set said clutch and to determine forward rotation, a key operable to set said clutch and to determine reverse rotation, and means operable to release the clutch upon manual release of either key.

27. In a calculating machine, reversible numeral wheels, actuating means therefor, driving means including a motor, clutch means operable to initiate and effect transmission of movement from said motor forwardly or reversely to said actuating means, means operable to set said clutch and to determine forward or reverse rotation, including a forward rotation key, a reverse rotation key and members operable to set the clutch during the depression of either key, and means operable to release the clutch upon manual release of either key.

28. In a calculating machine, reversible numeral wheels, actuating mechanism therefor, driving means including a motor, a clutching and reversing transmission mechanism between said motor and said actuating means, operating means including a forward rotation key, a reverse rotation key and members operable to adjust said transmission mechanism by direct impulse of either key to determine the direction and thereafter to initiate the movement and means operable to release the clutch upon manual release of either key.

29. In a calculating machine, reversible numeral wheels, actuating means therefor having a reversible cycle of operation, a motor, a clutching and reversing transmission mechanism between said motor and said actuating means, and means operable by a single selective operative stroke to control said transmission mechanism and thereby initiate and effect positive or negative calculations.

30. In a calculating machine, reversible numeral wheels, actuating means therefor, driving means, and means to establish a driving connection with the actuating means, including a pivoted member, a reciprocatory key engageable with said member at one side of the pivot thereof to initiate and effect transmission of movement forwardly to said actuating means, and a reciprocatory key engageable with said member at the other side of the pivot thereof to initiate and effect transmission of movement reversely to said actuating means.

31. In a calculating machine, reversible numeral wheels, actuating means therefor, driving means including a motor, clutch means operable to initiate and effect transmission of movement from said motor forwardly or reversely to said actuating means, including a selectively settable member, and operating means including a key adapted to set said clutch member for forward actuation, and a key adapted to set said clutch member for reverse actuation.

32. In a calculating machine, reversible numeral wheels, reversible rotary actuating mechanism therefor comprising ordinal registration members, carry members and a common member adapted to impart continuous movement thereto, means for driving said common member continuously in either direction throughout a cycle of operation, and control means including a key operable to determine and initiate the forward drive, and a key operable to determine and initiate the reverse drive.

33. In a calculating machine, numeral wheels, actuating means therefor including reversible rotary members, and means for imparting to said members one or more cycles of continuous forward or reverse rotation, including a motor rotatable in a single direction and control devices including a key operable to initiate the drive and determine forward rotation and a key operable to initiate the drive and determine reverse rotation.

34. In a calculating machine, reversible numeral wheels, actuating means therefor having a reversible cycle of operation, driving means including a motor, a clutch between said motor and said actuating means, means for engaging the clutch, and means for releasing the clutch at the end of an operative cycle, said clutch engaging means being operable during any part of a cycle to determine the action of the clutch releasing means.

35. In a calculating machine, reversible numeral wheels, actuating means therefor having a reversible cycle of operation, driving means including a motor, a clutch between said motor and said actuating means, means for engaging the clutch, and means including a normally restrained member for releasing the clutch at the end of an operative cycle, said clutch engaging means being operable during any part of a cycle to release said normally restrained member.

36. In a calculating machine, numeral wheels, means adapted to actuate said wheels to register positive or negative values, driving means including a motor, a clutch between said motor and said actuating means, operating means therefor including a positive registration key and a negative registration key, means operable to retract a depressed key immediately upon its manual release, means governed by either key in the retraction thereof for stopping the actuating means, and means for preventing depression of a key during the operative portion of the cycle of the actuating means.

37. In a calculating machine, numeral wheels, means adapted to actuate said wheels to register positive or negative values, driving means including a motor, a clutch between said motor and said actuating means, means for engaging the clutch including a positive registration key and a negative registration key, means operable to retract a depressed key immediately upon its manual release, means governed by either key in the retraction thereof for releasing the clutch and for stopping the actuating means, and means for preventing depression of a key during the operative portion of the cycle of the actuating means.

38. In a calculating machine, numeral wheels, reversible actuating means therefor, and means including a plurality of keys selectively operable by a single manual movement to initiate and effect continuous forward or reverse movement of said actuating means through a selected number of cycles of operation.

39. In a calculating machine, numeral wheels, reversible actuating means therefor, driving means including a motor, means including a plurality of keys selectively operable to initiate and effect transmission of movement forwardly or reversely from the motor to the actuating means, and means timed by the manual release of said keys for stopping the actuating means in full-cycle position.

40. In a calculating machine, numeral wheels, means adapted to actuate said wheels to register positive or negative values, driving means including a motor, means including positive and negative operation keys adapted by a single movement to effect continuous transmission of movement from said motor to said actuating means through a variable number of cycles of operation, and means for stopping the actuating means in full-cycle position upon manual release of either of said keys.

41. In a calculating machine, numeral wheels, actuating means adapted to register positive and negative values upon said wheels, driving means including a motor, means for effecting transmission of movement from the motor to the actuating means, including a positive value key, a negative value key, and a lever operable by either key from a fulcrum upon the other key to effect the transmission.

42. In a calculating machine, numeral wheels, actuating means adapted to register positive and negative values upon said wheels, driving means including a motor, means for effecting transmission of movement from the motor to the actuating means, including a positive value key, a negative value key and a lever operable by either key from a fulcrum upon the other key to effect the transmission, and means for preventing simultaneous depression of said keys.

43. In a calculating machine, reversible numeral wheels, reversible actuating means therefor, driving means including a continuously rotating motor, transmission means between said motor and said actuating means including a selective clutch manually operable to determine the direction of rotation of said actuating means and to initiate the movement thereof in either direction.

44. In a calculating machine, numeral wheels, reversible actuating means therefor, driving means including a motor rotatable in a single direction, and clutch means between said motor and said actuating means adapted for selective manual operation to initiate and effect transmission of movement from said driving means forwardly or reversely to said actuating means.

45. In a calculating machine, numeral wheels, reversible actuating means therefor including differential selecting members, driving means including a motor rotatable in a single direction, and clutch means between said motor and said differential members adapted for selective manual operation to initiate and effect transmission of movement from said driving means forwardly or reversely to said actuating means.

46. In a calculating machine, numeral wheels, reversible actuating means therefor, driving means including a motor rotatable in a single direction, clutch means operable to initiate and effect transmission of movement from said driving means forwardly or reversely to said actuating means, and means for manually effecting the clutch and determining the direction of movement, including a member operable to effect said clutch and determine said forward movement, and a member operable to effect said clutch and determine said reverse movement.

47. In a calculating machine, numeral wheels, reversible actuating means therefor, driving means including two rotating elements and a motor, and means selectively engageable with either of said elements to initiate and effect transmission of movement from said driving means forwardly or reversely to said actuating means.

48. In a calculating machine, numeral wheels, reversible actuating means therefor, driving means including oppositely rotating elements and a motor, and means selectively engageable with either of said elements to initiate and effect transmission of movement from said driving means forwardly or reversely to said actuating means.

49. In a calculating machine, numeral wheels, reversible actuating means therefor, driving means including two rotating elements and a motor, and means engageable with either of said elements to initiate and effect transmission of movement from said driving means forwardly or reversely to said actuating means, a member operable to effect the engagement with one of said elements, and a member operable to effect the engagement with the other element.

50. In a calculating machine, numeral wheels, reversible actuating means therefor, driving means including a motor and differential gearing connected therewith including two rotating elements, and positive stop means engageable with either of said elements to effect forward or reverse movement of said actuating means.

51. In a calculating machine, numeral wheels, reversible actuating means therefor, driving means including a motor and differential gearing connected therewith including oppositely rotating elements, and positive stop means engageable with either of said elements to effect forward or reverse movement of said actuating means.

52. In a calculating machine, numeral wheels, reversible actuating means therefor, driving means including a motor and differential gearing connected therewith including two rotating elements, and a pivoted lever positively engageable with either of said elements to stop the same and effect forward or reverse movement of said actuating means.

53. In a calculating machine, numeral wheels, reversible actuating means therefor, driving means including a motor and differential gearing connected therewith including two rotating elements, and a pivoted lever positively engageable with either of said elements to stop the same and effect forward or reverse movement of said actuating means, and means for setting said lever in position engaging either element or in neutral disengaged position.

54. In a calculating machine, numeral wheels, reversible actuating means therefor, driving means including a motor and differential gearing connected therewith including two rotating elements, positive stop means engageable with either of said elements to effect forward or reverse movement of said actuating means, and means for releasing the stop selectively at the end of one or more cycles of operation.

55. In a calculating machine, numeral wheels, reversible actuating means therefor, driving means including a motor and differential gearing connected therewith including two rotating elements, positive stop means engageable with either of said elements to effect forward or reverse movement of said actuating means, and means adapted to be set at any portion of an operative cycle to release the drive and to stop the actuating means at the end of said cycle.

56. In a calculating machine, numeral wheels, reversible actuating means therefor, driving means including a motor and differential gearing connected therewith including a driving element, direction-controlling elements and a driven element, and means engageable with either of said controlling elements to effect forward or reverse movement of said actuating means, the driving ratio of said driving and driven elements being substantially the same in forward and reverse rotation.

57. In a calculating machine, numeral wheels, reversible actuating means therefor, driving means including a motor and planetary gearing connected therewith including normally rotating elements, and key operated stop means selectively engageable with said elements to effect transmission of movement from said motor forwardly or reversely to said actuating means.

58. In a calculating machine, numeral wheels, actuating means therefor, driving means including a motor, clutch means selectively settable to effect transmission of movement from said driving means forwardly or reversely to said actuating means, freely retractable operating means selectively operable to set said clutch, and means for restoring said clutch to normal disengaged position upon manual release of the operating means.

59. In a calculating machine, numeral wheels, actuating means therefor, driving means including a motor, clutch means settable to effect transmission of movement from said driving means to said actuating means, freely retractable operating means operable to set said clutch, and means for restoring said clutch to normal disengaged position, including a latch and an element normally restrained thereby and tripped by the operating means in the retractive movement thereof.

60. In a calculating machine, numeral wheels, reversible actuating means therefor comprising rotary elements, driving means including a motor, clutch means selectively operable to effect transmission of movement from said driving means forwardly or reversely to said actuating means, and means for releasing the clutch, having a direction of movement invariable with relation to the cycle of movement of the actuating means and including an oscillatory member driven by one of said reversible rotary elements.

61. In a calculating machine, numeral wheels, reversible actuating means therefor comprising rotary elements, driving means including a motor, clutch means selectively operable to effect transmission of movement from said driving means forwardly or reversely to said actuating means, and means for releasing the clutch and thereafter stopping the actuating means in full-cycle position, said means having a direction of movement invariable with relation to the cycle of movement of the actuating means and including an oscillatory member, driven by one of said reversible rotary elements.

62. In a calculating machine, numeral wheels, actuating means therefor comprising rotary elements, driving means including a motor, clutch means operable to effect transmission of movement from said driving means to said actuating means, and reciprocatory means for releasing the clutch including an oscillatory member in fixed driving connection with one of said rotary elements, a normally restrained element movable into the path of said oscillatory member, and means for tripping said restrained element.

63. In a calculating machine, numeral wheels, actuating means therefor comprising rotary elements, driving means including a motor, clutch means operable to effect transmission of movement from said driving means to said actuating means, a device operable to effect said clutch, and reciprocatory means for releasing the clutch upon return of the operating device to inactive position, said means including an oscillatory member in fixed driving connection with one of said rotary elements, a normally restrained element movable into the path of said oscillatory member, and means for tripping said restrained element.

64. In a calculating machine, numeral wheels, reversible actuating means therefor, driving means including a plurality of clutch elements and a motor, and means engageable with one of said elements to initiate and effect transmission of movement forwardly and with another of said elements to initiate and effect transmission of movement reversely from said driving means to said actuating means.

65. In a calculating machine, numeral wheels, reversible actuating means therefor, driving means including a plurality of clutch elements and a motor, and operating means including a member operable to engage one of said elements to initiate and effect transmission of movement forwardly, and a member operable to engage another of said elements to initiate and effect transmission of movement reversely from said driving means to said actuating means.

66. In a calculating machine, numeral wheels, reversible actuating means therefor, driving means including a plurality of differential rotary elements and a motor, and means engageable with one of said elements to initiate and effect transmission of movement forwardly and with another of said elements to initiate and effect transmission of movement reversely from said driving means to said actuating means.

67. In a calculating machine, numeral wheels, reversible actuating means therefor, driving means including a plurality of differential rotary elements and a motor, and operating means including a member operable to engage one of said elements to initiate and effect transmission of movement forwardly, and a member operable to engage another of said elements to initiate and effect transmission of movement reversely from said driving means to said actuating means.

68. In a calculating machine, numeral wheels, reversible actuating means therefor, driving means including a motor and differential gearing connected therewith including a plurality of normally rotating elements, and positive stop means engageable with one of said elements to effect transmission of movement forwardly and with another of said elements to effect transmission of movement reversely from said driving means to said actuating means.

69. In a calculating machine, numeral wheels, reversible actuating means therefor, driving means including a motor and differential gearing connected therewith including a plurality of normally rotating elements, and a pivoted lever positively engageable with one of said elements to stop the same and effect forward movement, and engageable with another element to stop the same and effect reverse movement of said actuating means.

70. In a calculating machine, numeral wheels, reversible actuating means therefor, driving means including a motor and differential gearing connected therewith including a plurality of normally rotating elements, a pivoted lever positively engageable with one of said elements to stop the same and effect forward movement, and engageable with another element to stop the same and effect reverse movement of said actuating means, and means for setting said lever in position engaging either element or in neutral disengaged position.

71. In a calculating machine, numeral wheels, actuating means therefor, driving means for said actuating means including a motor, and a lost motion connection interposed in said driving means and comprising independently rotatable parts provided with contact members and a spring tending to hold said members out of driving contact.

72. In a calculating machine, numeral wheels, actuating means therefor, driving means including a motor, clutch means operable to effect transmission of movement from said driving means to said actuating means, and a lost motion connection interposed in said driving means and comprising independently rotatable parts provided with contact members and a spring acting to hold said members out of driving contact while said clutch is released.

73. In a calculating machine, numeral wheels, actuating means therefor, driving means including a motor, positive clutch means operable to effect transmission of movement from said driving means to said actuating means, and means for delaying said transmission after the clutch has been engaged.

74. In a calculating machine, numeral wheels, actuating means therefor, driving means including a motor, clutch means operable to effect transmission of movement from said driving means to said actuating means, and means for releasing the clutch as said actuating means pass through normal stopping position means for gradually checking the momentum of said actuating means upon release of said clutch, and for returning the same to normal position.

75. In a calculating machine, numeral wheels, reversible actuating means therefor, driving means including a motor, clutch means operable to effect transmission of movement from said driving means to said actuating means, means for releasing the clutch as said actuating means pass through normal stopping position and means for gradually checking the momentum of said actuating means upon release of said clutch, and for returning the same to normal position.

76. In a calculating machine, numeral wheels, actuating means therefor, driving means including a motor, a freely retractable operating member, and means whereby said member may be manually operated to initiate a registration upon said wheels and manually released to terminate a registration, in combination with means operable to arrest the actuating means and terminate a registration while said member is in operative position.

77. In a calculating machine, numeral wheels, means for actuating said wheels to register positive or negative values, driving means including a motor, freely retractable positive and negative actuation keys, and means whereby either key may be manually operated to initiate a registration upon said wheels and manually released to terminate a registration, in combination with means operable to arrest the actuating means and terminate a registration while either key is in operative position.

78. In a calculating machine, numeral wheels, means for actuating said wheels to register positive or negative values, driving means including a motor, full-cycle stop means for said actuating means, a key manually operable to initiate transmission of movement from said motor to said actuating means, control means acting to operate said stop upon manual release of said key, and means independent of said key for operating said stop, said control means being adapted to allow operation of the stop by said independent means while the key is in operative position.

79. In a calculating machine, numeral wheels, actuating means therefor, driving means including a motor, and means for determining one or more cycles of operation of said actuating means, including a manually operable device and an independently movable operating member normally coupled thereto, and means for automatically uncoupling the operating device from the operating member.

80. In a calculating machine, numeral wheels, reversible actuating means therefor, driving means including a motor, clutch means operable to effect transmission of movement from said driving means forwardly or reversely to said actuating means, a freely retractable device manually operable to initiate said transmission and to determine the direction of movement, and means for stopping forward or reverse movement of the actuating means in full-cycle position, including a device invariably operable in the stopping operation to release the clutch.

81. In a calculating machine, reversible numeral wheels, actuating means therefor having a reversible cycle of operation, and means for determining one or more cycles of forward or reverse operation, including a key manually operable to intitiate the actuation and manually releasable to terminate the actuation.

82. In a calculating machine, reversible numeral wheels, actuating means therefor having a reversible cycle of operation, means for determining one or more cycles of forward or reverse operation in the performance of the four rules calculations, and automatically operating stop devices adapted for optional use to facilitate the performance of certain of the four rules calculations.

83. In a calculating machine, reversible numeral wheels, actuating means therefor having a reversible cycle of operation, means for determining one or more cycles of forward or reverse operation in the performance of the four rules calculations, including means for stopping the actuating means in full-cycle position and means for controlling said stopping means, and alternative automatic control means for said stopping means adapted for optional use to facilitate the performance of certain of the four rules calculations.

84. In a calculating machine, reversible numeral wheels, actuating means therefor having a reversible cycle of operation, and means for determining one or more cycles of forward or reverse actuation, including a manually operable device, an independently movable operating member normally coupled thereto, and means for automatically uncoupling the operating device from the operating member.

85. In a calculating machine, reversible numeral wheels, actuating means therefor having a reversible cycle of operation, driving means including a motor, clutch means operable to effect transmission of movement from said driving means to said actuating means, and means for stopping the actuating means, including a plurality of independent stop controlling devices and a device invariably operable in the stopping operation to release the clutch.

86. In a calculating machine, numeral wheels, reversible actuating means therefor, driving means including a motor, clutch means selectively operable to effect transmission of movement from said driving means forwardly or reversely to said actuating means, and means for stopping the forward or reverse movement of the actuating means, including a device invariably operable in the stopping operation to release the clutch.

87. In a calculating machine, numeral wheels, actuating means therefor, driving means including a motor, clutch means selectively operable to initiate and effect transmission of movement from said driving means forwardly or reversely to said actuating means, and means for stopping the actuating means, including a member operable by a single movement to release said clutch and thereafter to effect the stop.

88. In a calculating machine, numeral wheels, actuating means therefor, driving means including a motor, clutch means operable to initiate and effect transmission of movement from said driving means to said actuating means, and means for stopping the actuating means, including a normally restrained element and means for releasing said element to effect the stop upon release of said clutch.

89. In a calculating machine, numeral wheels, actuating means therefor, driving means including a motor, clutch means operable to effect transmission of movement from said driving means to said actuating means, a device operable to effect said clutch, and means for stopping the actuating means, including a normally restrained element and spring means for releasing said element upon return of the operating device to inactive position.

90. In a calculating machine, numeral wheels, reversible actuating means therefor, driving means including a motor, clutch means selectively operable to effect transmission of movement from said driving means forwardly or reversely to said actuating means, means selectively operable to effect forward or reverse operation of said clutch, and means for stopping the forward or reverse movement of the actuating means, including a normally restrained element and means for releasing said element upon return of the operating means to inactive position.

91. In a calculating machine, numeral wheels, reversible actuating means therefor, driving means including a motor, clutch means selectively operable to effect transmission of movement from said driving means forwardly or reversely to said actuating means, means selectively operable to effect forward or reverse operation of said clutch, and means for stopping the forward or reverse movement of the actuating means, including a normally restrained element and means for releasing said element upon return of the operating means to inactive position, including a spring-impelled tripping element and a cam element engaging the tripping element and having operative connection with said operating means.

92. In a calculating machine, numeral wheels, reversible actuating means therefor, driving means including a motor, clutch means selectively operable to effect transmission of movement from said driving means forwardly or reversely to said actuating means, means selectively operable to effect forward or reverse operation of said clutch, and means for stopping the actuating means, including a member similarly actuated during forward or reverse movement of the actuating means, a normally restrained element movable into the path of said member, and means for releasing said element upon return of the operating means to inactive position.

93. In a calculating machine, numeral wheels, reversible actuating means therefor, driving means including a motor, clutch means selectively operable to effect transmission of movement from said driving means forwardly or reversely to said actuating means, means selectively operable to effect forward or reverse operation of said clutch, and means for stopping the actuating means, including a rock lever having operative connection with the actuating means, a normally restrained element movable into the path of said rock lever, and means for releasing said element upon return of the operating means to inactive position.

94. In a calculating machine, numeral wheels, actuating means therefor, driving means including a motor, clutch means operable to effect transmission of movement from said driving means to said actuating means, means operable to effect said clutch, and means for stopping the actuating means, including a normally restrained element and means for releasing said element upon return of the operating means to inactive position, including a normally restrained pawl, and means for releasing said pawl and for holding it under a second restraint while the operating means remains in active position.

95. In a calculating machine, numeral wheels, actuating means therefor, driving means including a motor, clutch means operable to effect transmission of movement from said driving means to said actuating means, means operable to effect said clutch, and means for stopping the actuating means, including a normally restrained element and means for releasing said element upon return of the operating means to inactive position, including a lever, a normally restrained pawl mounted thereon, a cam element having operating connection with the operating means and engaging said lever to release said pawl and hold it under a second restraint while the operating means remains in active position.

96. In a calculating machine, numeral wheels, actuating means therefor, driving means including a motor, clutch means operable to effect transmission of movement from said driving means to said actuating means, a device operable to effect said clutch, and means for stopping the actuating means, including a member operable by said actuating means at a variable speed, a normally restrained element movable into the path of said member, and means for releasing said element upon return of the operating device to inactive position and for engaging the same with said member as the latter passes through a low speed position.

97. In a calculating machine, numeral wheels, actuating means therefor including a shaft, driving means including a motor, clutch means operable to effect transmission of movement from said driving means to said actuating means, a device operable to effect said clutch, and means for stopping the actuating means, including a crank arm upon said shaft, a rock-lever having operative connection with said arm, a normally restrained element movable into the path of said rock-lever, and means for releasing said element upon return of the operating device to inactive position and for engaging the same with said rock-lever as the crank arm approximates dead-center position.

98. In a calculating machine, numeral wheels, actuating means therefor including a shaft and members rotatably mounted thereon and having their center of gravity eccentric of said shaft, driving means including a motor, clutch means operable to effect transmission of movement from said driving means to said actuating means, and means for checking the momentum of the actuating means upon release of said clutch, adapted also to counterbalance the eccentric weight of said members.

99. In a calculating machine, numeral wheels, actuating means therefor including a shaft and members rotatably mounted thereon and having their center of gravity eccentric of said shaft, driving means including a motor, clutch means operable to effect transmission of movement from said driving means to said actuating means, and spring means for checking the momentum of the actuating means upon release of said clutch, adapted also to counterbalance the eccentric weight of said members.

100. In a calculating machine, number wheels, actuating means therefor including a shaft and members rotatably mounted thereon and having their center of gravity eccentric of said shaft, driving means including a motor, clutch means operable to effect transmission of movement from said driving means to said actuating means, and means comprising a cam and a spring-pressed lever cooperating therewith for checking the momentum of the actuating means upon release of said clutch, adapted also to counterbalance the eccentric weight of said members.

101. In a calculating machine, numeral wheels, actuating means therefor including reversible rotary elements, driving means including a motor, clutch means operable to effect transmission of movement from said driving means to said actuating means, and a member driven by one of said reversible rotary elements and operative in an invariable direction to release the clutch.

102. In a calculating machine, numeral wheels, actuating means therefor including reversible rotary elements, a motor, clutching and reversing means between said motor and said actuating means, and means for stopping said actuating means in full-cycle position, including a member fast to one of said reversible rotary elements and having an invariable stopping movement.

103. In a calculating machine, numeral wheels, actuating means therefor having a reversible cycle of operation and including reversible rotary elements, a motor, clutching and reversing means between said motor and said actuating means, and means for stopping said actuating means in full-cycle position, including a member fast to one of said reversible rotary elements and having an invariable stopping movement.

104. In a calculating machine, numeral wheels, actuating means therefor comprising rotary elements, driving means including a motor, clutch means operable to effect transmission of movement from said driving means to said actuating means, and reciprocatory means for checking the momentum of said actuating means upon release of said clutch, said means including an oscillatory member in fixed driving connection with one of said rotary elements, and a device for checking the oscillatory movement of said member.

105. In a calculating machine, numeral wheels, reversible actuating means therefor comprising rotary elements, driving means including a motor, clutch means operable to effect transmission of movement from said driving means forwardly or reversely to said actuating means, and means for checking the momentum of said actuating means upon release of said clutch, said means having a direction of movement invariable with relation to the cycle of movement of the actuating means and including an oscillatory member in fixed driving connection with one of said rotary elements, and a device for checking the oscillatory movement of said member.

106. In a calculating machine, numeral wheels, actuating means therefor comprising rotary elements, driving means including a motor, clutch means operable to effect transmission of movement from said driving means to said actuating means, and reciprocatory means for stopping the actuating means in full-cycle position upon release of said clutch, said means including an oscillatory member in fixed driving connection with one of said rotary elements.

107. In a calculating machine, numeral wheels, actuating means therefor comprising rotary elements, driving means including a motor, clutch means operable to effect transmission of movement from said driving means to said actuating means, and reciprocatory means for retarding and thereafter stopping the actuating means in full-cycle position upon release of said clutch, said means including an oscillatory member in fixed driving connection with one of said rotary elements.

108. In a calculating machine, numeral wheels, reversible actuating means therefor comprising rotary elements, driving means including a motor, clutch means operable to effect transmission of movement from said driving means forwardly or reversely to said actuating means, and means for retarding and thereafter stopping the actuating means in full-cycle position upon release of said clutch, said means having a direction of movement invariable with relation to the cycle of movement of the actuating means and including an oscillatory member in fixed driving connection with one of said rotary elements.

109. In a calculating machine, numeral wheels, actuating means therefor comprising rotary elements, driving means including a motor, clutch means operable to effect transmission of movement from said driving means to said actuating means, and reciprocatory means for stopping the actuating means in full-cycle position upon release of said clutch, said means including an oscillatory member in fixed driving connection with one of said rotary elements, a normally restrained element movable into the path of said oscillatory member, and means for tripping said restrained element.

110. In a calculating machine, numeral wheels, actuating means therefor comprising rotary elements, driving means including a motor, clutch means operable to effect transmission of movement from said driving means to said actuating means, a device operable to effect said clutch, and reciprocatory means for stopping the actuating means in full-cycle position upon return of the operating device to inactive position, said means including an oscillatory member in fixed driving connection with one of said rotary elements, a normally restrained element movable into the path of said oscillatory member, and means for tripping said restrained element.

111. In a calculating machine, numeral wheels, actuating means therefor, driving means including a motor, clutch means operable to effect transmission of movement from said driving means to said actuating means, and means for stopping said actuating means upon release of said clutch, including positive stop means adapted to prevent continued movement in one direction and to allow a rebound and means for checking the rebound of the parts following the action of the positive stop means.

112. In a calculating machine, numeral wheels, reversible actuating means therefor, driving means including a motor, clutch means operable to effect transmission of movement from said driving means forwardly or reversely to said actuating means, and means for stopping said actuating means upon release of said clutch, including positive stop means adapted to prevent continued movement in either original direction and to allow a rebound and means for checking the rebound of the parts following the action of the positive stop means.

113. In a calculating machine, numeral wheels, actuating means therefor, driving means including a motor, clutch means operable to effect transmission of movement from said driving means to said actuating means, and means for stopping the actuating means, including a normally restrained element and means comprising a spring energized by the action of said motor for releasing said element to effect the stop upon release of said clutch.

114. In a calculating machine, numeral wheels, reversible actuating means therefor, driving means including a motor, clutch means operable to effect transmission of movement from said driving means to said actuating means, and means for stopping said actuating means upon release of said clutch, adapted to allow movement of the actuating means beyond normal position of rest but to prevent movement in either direction into active position.

115. In a calculating machine, numeral wheels, reversible actuating means therefor, driving means including a motor, clutch means operable to effect transmission of movement from said driving means to said actuating means, and means for stopping said actuating means upon release of said clutch, adapted to stop the actuating means successively in a plurality of full-cycle positions.

116. In a calculating machine, numeral wheels, reversible actuating means therefor, driving means including a motor, clutch means operable to effect transmission of movement from said driving means to said actuating means, means for stopping said actuating means when said clutch is released, and means for automatically releasing the actuating means from the stopping means.

117. In a calculating machine, numeral wheels, actuating means therefor, driving means including a motor, clutch means operable to effect transmission of movement from said driving means to said actuating means, means for retarding said actuating means when said clutch is released, and means for automatically rendering said retarding means inoperative after the actuating means has been prevented thereby from passing into active position.

118. In a calculating machine, numeral wheels, actuating means therefor having a zone of idle movement, driving means including a motor, clutch means operable to effect transmission of movement from said driving means to said actuating means, and means for interrupting the motion of said actuating means when the clutch is released, adapted to prevent passage thereof into active position and to retard movement thereof, the retarding action continuing during a movement of said actuating means of greater extent than that provided by the limits of the idle zone.

119. In a calculating machine, numeral wheels, reversible actuating means therefor, driving means including a motor, clutch means operable to effect transmission of movement from said driving means to said actuating means, and means for stopping said actuating means upon release of said clutch, adapted to interrupt the movement of the actuating means in either of two inactive positions and to restore the same to a common normal position.

120. In a calculating machine, numeral wheels, reversible actuating means therefor, driving means including a motor, clutch means operable to effect transmission of movement from said driving means to said actuating means, and means for stopping said actuating means upon release of said clutch, adapted to confine the actuating means between two inactive positions and to stop the same in an intermediate normal position.

121. In a calculating machine, numeral wheels, reversible actuating means therefor, driving means including a motor, clutch means operable to effect transmission of movement from said driving means to said actuating means, means for stopping said actuating means upon release of said clutch, adapted to stop the actuating means successively in a plurality of inactive positions, and automatic means for releasing the actuating means from said stop.

122. In a calculating machine, numeral wheels, reversible actuating means therefor, driving means including a motor, clutch means operable to effect transmission of movement from said driving means to said actuating means, means for stopping said actuating means upon release of said clutch, adapted to confine the actuating means between two inactive positions, and automatic means for releasing the actuating means from said stop.

123. In a calculating machine, numeral wheels, reversible actuating means therefor including a shaft, driving means including a motor, clutch means operable to effect transmission of movement from said driving means to said actuating means, and means for stopping said actuating means upon release of said clutch, including a crank arm upon said shaft, a rock-lever having operative connection with said arm, and a member engageable with said rock-lever in a given position thereof, with the crank arm at either side of dead-center position.

124. In a calculating machine, numeral wheels, reversible actuating means therefor including a shaft, driving means including a motor, clutch means operable to effect transmission of movement from said driving means to said actuating means, and means for stopping said actuating means upon release of said clutch, including a crank arm upon said shaft, a rock-lever having operative connection with said arm, and a member engageable with said rock-lever successively in a given position thereof, with the crank arm successively at the one end at the other side of dead-center position.

125. In a calculating machine, numeral wheels, reversible actuating means therefor including a shaft, driving means including a motor, clutch means operable to effect transmission of movement from said driving means to said actuating means, means for stopping said actuating means upon release of said clutch, including a crank-arm upon said shaft, a rock-lever having operative connection with said arm, and a member engageable with said rock-lever successively in a given position thereof, with the crank arm successively at the one and at the other side of dead-center position, and automatic means for releasing the actuating means from said stop.

126. In a calculating machine, numeral wheels, actuating means therefor including a shaft, driving means including a motor, clutch means operable to effect transmission of movement from said driving means to said actuating means, a device operable to effect said clutch, and means for stopping said actuating means, including a crank-arm upon said shaft, a rock-lever having operative connection with said arm, and a normally restrained member releasable upon release of said operating device to stop said rock-lever successively in a given position thereof, with the crank-arm successively at the one and at the other side of dead-center position.

127. In a calculating machine, numeral wheels, actuating means therefor including a shaft, driving means including a motor, clutch means operable to effect transmission of movement from said driving means to said actuating means, a device operable to effect said clutch, means for stopping said actuating means, including a crank-arm upon said shaft, a rock-lever having operative connection with said arm, and a normally restrained member releasable upon release of said operating device to stop said rock-lever successively in a given position thereof, with the crank-arm successively at the one and at the other side of dead-center position, and means for restoring said member to normal restrained position after the second stopping of the rock-lever.

128. In a calculating machine, numeral wheels, reversible actuating means therefor comprising rotary elements, driving means including a motor, clutch means operable to effect transmission of movement from said driving means to said actuating means, and means including an oscillatory member, driven by one of said rotary elements, for stopping said actuating means upon release of said clutch, adapted to stop the actuating means successively in a plurality of inactive positions.

129. In a calculating machine, numeral wheels, reversible actuating means therefor comprising rotary elements, driving means including a motor, clutch means operable to effect transmisison of movement from said driving means to said actuating means, and means for stopping said actuating means upon release of said clutch, adapted to confine the actuating means between two inactive positions, and having a direction of movement invariable with relation to the cycle of movement of the actuating means and including an oscillatory member driven by one of said rotary elements.

130. In a calculating machine, numeral wheels, reversible actuating means therefor comprising rotary elements, driving means including a motor, clutch means operable to effect transmission of movement from said driving means to said actuating means, and means for stopping said actuating means upon release of said clutch, adapted to confine the actuating means between two inactive positions and to retard movement thereof, said means having a direction of movement invariable with relation to the cycle of movement of the actuating means and including an oscillatory member driven by one of said rotary elements.

131. In a calculating machine, numeral wheels, actuating means therefor, driving means including a motor, clutch means operable to effect transmission of movement from said driving means to said actuating means, and means for stopping said actuating means upon release of said clutch, including means adapted to stop the actuating means successively in a plurality of inactive positions, means for releasing the stopping means, and means for checking the rebound of the parts following said release.

132. In a calculating machine, numeral wheels, actuating means therefor including a shaft and members rotatably mounted thereon and having their center of gravity eccentric of said shaft, driving means including a motor, clutch means operable to effect transmission of movement from said driving means to said actuating means, and means for stopping said actuating means upon release of said clutch, including means adapted to stop the actuating means successively in a plurality of inactive positions, means for releasing the stopping means, and cam means for checking the rebound of the parts following said release, adapted also to counterbalance the eccentric weight of said actuating members.

133. In a calculating machine, numeral wheels, reversible actuating means therefor, hand operating means for said actuating means, alternative driving means including a motor, clutch means operable to effect transmission of movement from said motor to said actuating means, means for stopping said actuating means when said clutch is released, and means for automatically releasing the actuating means from the stopping means.

134. In a calculating machine, numeral wheels, reversible actuating means therefor, hand operating means for said actuating mens, alternative driving means including a motor, clutch means operable to effect transmission of movement from said motor to said actuating means, means for stopping said actuating means upon release of said clutch, adapted to stop the actuating means successively in a plurality of inactive positions, and automatic means for releasing the actuating means from said stop.

135. In a calculating machine, numeral wheels, reversible actuating means therefor, hand operating means for said actuating means, alternative driving means including a motor, clutch means operable to effect transmission of movement from said motor to said actuating means, means for stopping said actuating means upon release of said clutch, adapted to confine the actuating means between two inactive positions, and automatic means for releasing the actuating means from said stop.

136. In a calculating machine, numeral wheels, reversible actuating means therefor including a shaft, hand operating means for said actuating means, alternative driving means including a motor, clutch means operable to effect transmission of movement from said motor to said actuating means, means for stopping said actuating means upon release of said clutch, including a crank arm upon said shaft, a rock-lever having operative connection with said arm, and a member engageable with said rock lever successively in a given position thereof, with the crank arm successively at the one and at the other side of dead-center position, and automatic means for releasing the actuating means from said stop.

137. In a calculating machine, reversible numeral wheels, actuating means therefor having a reversible cycle of operation, an operating device for said actuating means, and means for stopping the actuating means, including control members operable by a registering movement of said numeral wheels and control members operable by said operating device.

138. In a calculating machine, reversible numeral wheels, actuating means therefor having a reversible cycle of operation, an operating device for said actuating means, and means for stopping the actuating means, including a normally restrained element, means controlled by a registering movement of the numeral wheels for tripping said element, and means controlled by said operating device for tripping said element.

139. In a calculating machine, numeral wheels, actuating means therefor including carry timing elements upon said wheels, an operating device for said actuating means, and means for stopping the actuating means, including control members operable by one of said timing elements and control members operable by said operating device.

140. In a calculating machine, numeral wheels, actuating means therefor including carry timing elements upon said wheels, an operating device for said actuating means, and means for stopping the actuating means, including control members operable by one of said timing elements and control members operable by said operating device to effect the stop at the end of a cycle of operation.

141. In a calculating machine, reversible numeral wheels, actuating means therefor having a reversible cycle of operation, carry mechanism between each two adjacent wheels, an operating device for said actuating means, means for stopping the actuating means upon passage of the highest order numeral wheel forwardly to or reversely from zero position, and means controlled by said operating member independently of the numeral wheel for operating said stopping means.

142. In a calculating machine, reversible numeral wheels, actuating means therefor having a reversible cycle of operation, carry mechanism between each two adjacent wheels, an operating device for said actuating means, means for stopping the actuating means including a normally restrained element, means for tripping said element upon passage of the highest order numeral wheel forwardly to or reversely from zero position, and means controlled by said operating device independently of the numeral wheels for tripping said element.

143. In a calculating machine, numeral wheels, actuating means therefor, an operating device for said actuating means, means for stopping the actuating means, means for operating said stopping means upon given registering movement of a numeral wheel, means controlled by the operating device for releasing the stopping means automatically, and means for bringing the stopping means into action upon return of said operating device to inactive position.

144. In a calculating machine, numeral wheels, actuating means therefor, an operating device for said actuating means, means for stopping the actuating means including a normally restrained element, means controlled by a registering movement of the numeral wheels for tripping said element, means controlled by the operating device for relatching said element automatically, and means for tripping said element upon return of said operating device to inactive position.

145. In a calculating machine, numeral wheels, actuating means therefor including rotary elements, an operating device for said actuating means, and reciprocatory means for stopping the actuating means, including an oscillatory member driven by one of said rotary elements, control members operable by a registering movement of said numeral wheels and control members operable by said operating device.

146. In a calculating machine, numeral wheels, actuating means therefor including rotary elements, an operating device for said actuating means, and reciprocatory means for retarding and thereafter stopping the actuating means, including an oscillatory member driven by one of said rotary elements, control members operable by a registering movement of said numeral wheels and control members operable by said operating device.

147. In a calculating machine, numeral wheels, actuating means therefor including rotary elements, an operating device for said actuating means, and reciprocatory means for stopping the actuating means, including an oscillatory member driven by one of said rotary elements, a normally restrained element movable into the path of said oscillatory member, members operable by a registering movement of said numeral wheels to trip said restrained element and members operable by said operating device to trip said restrained element.

148. In a calculating machine, reversible numeral wheels, actuating means therefor having a reversible cycle of operation, an operating device for said actuating means, and means for retarding and thereafter stopping forward or reverse movement of the actuating means, including a control member operable by a registering movement of said numeral wheels and control members operable by said operating device.

149. In a calculating machine, reversible numeral wheels, actuating means therefor having a reversible cycle of operation, an operating device for said actuating means, and means for retarding and thereafter stopping forward or reverse movement of the actuating means, including a normally restrained element, a member operable by a registering movement of said numeral wheels to trip said restrained element, and a member operable by said operating device to trip said restrained element.

150. In a calculating machine, numeral wheels, registering means therefor including an operating device and digit selecting members reversely operable to actuate the numeral wheels forwardly or reversely, means for stopping the registering means in full-cycle position, means for operating said stopping means upon given movement of said numeral wheels, means controlled by the operating device for releasing the stopping means automatically and means for bringing the stopping means into action upon return of said operating device to inactive position.

151. In a calculating machine, numeral wheels, registering means therefor including an operating device and digit selecting members reversely operable to actuate the numeral wheels forwardly or reversely, means for stopping the registering means in full-cycle position, including a normally restrained element, and means controlled by said numeral wheels for tripping said element, means controlled by the operating device for relatching said element automatically, and means for tripping said element upon return of said operating device to inactive position.

152. In a calculating machine, reversible numeral wheels, actuating means therefor having a reversible cycle of operation, carry mechanism between each two adjacent wheels, driving means including a motor, clutch means operable to effect transmission of movement from said driving means to said actuating means, and means for releasing the clutch upon passage of the highest order numeral wheel forwardly to or reversely from zero position.

153. In a calculating machine, reversible numeral wheels, actuating means therefor having a reversible cycle of operation, carry mechanism between each two adjacent wheels, driving means including a motor, clutch means operable to effect transmission of movement from said driving means to said actuating means, and means for releasing the clutch and for stopping the actuating means in full-cycle position upon passage of the highest order numeral wheel forwardly to or reversely from zero position.

154. In a calculating machine, the combination with reversible numeral wheels, selecting mechanism, actuating means having a reversible cycle of operation and adapted to register upon said numeral wheels amounts set up by said selecting mechanism; and driving means including a motor, of means for dividing an amount registered upon said wheels by an amount set up by said selecting mechanism, including means controlled by the numeral wheels for automatically stopping the actuating means when the proper quotient figure has been registered.

155. In a calculating machine, the combination with reversible numeral wheels, selecting mechanism, actuating means having a reversible cycle of operation and adapted to register upon said numeral wheels amounts set up by said selecting mechanism and driving means including a motor, of means for dividing an amount registered upon said wheels by an amount set up by said selecting mechanism, including means for automatically stopping the actuating means when the proper quotient figure has been registered, said means having a normally restrained element and a device controlled by the numeral wheels for tripping said element.

156. In a calculating machine, numeral wheels, actuating means therefor, an operating device for said actuating means, means for stopping the actuating means including a normally restrained element, means controlled by the numeral wheels for tripping said element, and means for neutralizing the action of said operating device during the functioning of said stopping means.

157. In a calculating machine, numeral wheels, actuating means therefor, driving means including a motor, clutch means adapted to effect transmission of movement from said driving means to said actuating means, a device operable to engage said clutch, means for stopping the actuating means including a normally restrained element, means controlled by the numeral wheels for tripping said element, and means for neutralizing the action of the operating device during the functioning of said stopping means.

158. In a calculating machine, numeral wheels, actuating means therefor comprising rotary elements, driving means including a motor, clutch means operable to effect transmission of movement from said driving means to said actuating means, a device operable to engage said clutch, and reciprocatory means for stopping the actuating means, including an oscillatory member, driven by one of said rotary elements, a normally restrained element movable into the path of said oscillatory member, means controlled by the numeral wheels for tripping said restrained element, and means operated from said oscillatory member for neutralizing the action of said operating device during the functioning of said stopping means.

159. In a calculating machine, numeral wheels, actuating means therefor, driving means including a motor, means for effecting transmission of movement from the driving means to the actuating means, including a manually operable device, means controlled by the numeral wheels for stopping the actuating means, and means for automatically disconnecting the operating device during the functioning of said stopping means.

160. In a calculating machine, numeral wheels, actuating means therefor, driving means including a motor, means for effecting transmission of movement from the driving means to the actuating means, including a manually operable device and an independently movable operating member normally coupled thereto, means controlled by the numeral wheels for stopping the actuating means, and means for automatically uncoupling the operating device from the operating member during the functioning of said stopping means.

161. In a calculating machine, numeral wheels, actuating means therefor, driving means including a motor, means for effecting transmission of movement from the driving means to the actuating means, including a manually operable device and an independently movable operating member normally coupled thereto, means controlled by the numeral wheels for stopping the actuating means, means for automatically uncoupling the operating device from the operating member during the functioning of said stopping means, and a spring tensioned by the operating device and serving upon release of said device to move the same to recoupling position.

162. In a calculating machine, numeral wheels, reversible actuating means therefor, driving means including a motor, means for effecting transmission of movement forwardly or reversely from the driving means to the actuating means, including a manually operable device movable selectively in either of two directions from neutral position, and an independently movable operating member normally coupled thereto, means controlled by the numeral wheels for stopping the actuating means, and means for automatically uncoupling the operating device from the operating member during the functioning of said stopping means.

163. In a calculating machine, numeral wheels, reversible actuating means therefor, driving means including a motor, means for effecting transmission of movement forwardly or reversely from the driving means to the actuating means, including a manually operable device movable selectively in either of two directions from neutral position, and an independently movable operating member normally coupled thereto, means controlled by the numeral wheels for stopping the actuating means, means for automatically uncoupling the operating device from the operating member during the functioning of said stopping means, and a spring tensioned by the operating device and serving upon release of said device to restore the same to normal re-coupling position.

164. In a calculating machine, numeral wheels, reversible actuating means therefor, driving means including a motor, means for effecting transmission of movement forwardly or reversely from the driving means to the actuating means, including a manually operable device movable selectively in either of two directions from neutral position, and an independently movable operating member normally coupled thereto, means controlled by the numeral wheels for stopping the actuating means, means for automatically uncoupling the operating device from the operating members during the functioning of said stopping means, and means for restoring the operating device and the operating member independently to normal re-coupling position.

165. In a calculating machine, numeral wheels, actuating means therefor, driving means including a motor, means for effecting transmission of movement from the driving means to the actuating means, including a manually operable device and an independently movable operating member normally coupled thereto, means controlled by the numeral wheels for stopping the actuating means, means for automatically uncoupling the operating device from the operating member during the functioning of said stopping means, and means energized by the action of said motor for restoring the operating member to re-coupling position.

166. In a calculating machine, numeral wheels, actuating means therefor, driving means including a motor means for effecting transmission of movement from the driving means to the actuating means, including a manually operable device and an independently movable operating member normally coupled thereto, means controlled by the numeral wheels for stopping the actuating means, means for automatically uncoupling the operating device from the operating member during the functioning of said stopping means, and means including a spring energized by the action of said motor for restoring the operating member to re-coupling position.

167. In a calculating machine, numeral wheels, actuating means therefor, driving means including a motor, clutch means operable to effect transmission of movement from said driving means to said actuating means, freely retractible means for setting said clutch, means operable upon retraction of the setting means to release the clutch with said actuating means in full-cycle position, and means for preventing release of the clutch before the actuating means have functioned.

168. In a calculating machine, numeral wheels, actuating means therefor having idle movement at the beginning of a cycle of operation, means for driving said actuating means including a motor and a freely retractible operating device, means for stopping said actuating means in full-cycle position, and means for preventing the operation of said stopping means during the initial idle movement of the actuating means.

169. In a calculating machine, numeral wheels, actuating means therefor having idle movement at the beginning of a cycle of operation, means for driving said actuating means including a motor, means for stopping said actuating means in full-cycle position, means for preventing the operating of said stopping means, and means for disabling the preventing means before the actuating means have completed an operative cycle.

170. In a calculating machine, numeral wheels, actuating means therefor, driving means including a motor, clutch means operable to effect transmission of movement from said driving means to said actuating means, means for stopping said actuating means in full-cycle position upon release of said clutch, including a normally restrained element and means for tripping said element, and means for preventing the operation of said tripping means before the actuating means have functioned.

171. In a calculating machine, numeral wheels, actuating means therefor, driving means including a motor, clutch means operable to effect transmission of movement from said driving means to said actuating means, means for stopping said actuating means in full-cycle position upon release of said clutch, including a normally restrained element and means including a lever for tripping said element, means independent of said clutch for restraining the tripping lever, and means for disabling the restraining means before the actuating means have completed an operative cycle.

172. In a calculating machine, numeral wheels, actuating means therefor, driving means including a motor, clutch means operable to effect transmission of movement from said driving means to said actuating means, means for stopping said actuating means in full-cycle position upon release of said clutch including a normally restrained element and means including a lever for tripping said element, means independent of said clutch for restraining the tripping lever, and latch means operable before the actuating means to disable the restraining means have completed an operative cycle.

173. In a calculating machine, numeral wheels, actuating means therefor, driving means including a motor, clutch means operable to effect transmission of movement from said driving means to said actuating means, means for stopping said actuating means in full-cycle position upon release of said clutch including a normally restrained element and means including a lever for tripping said element, means independent of said clutch for restraining the tripping lever, and latch means operable before the actuating means have completed an operative cycle to disable the restraining means, said tripping lever acting to release the latch upon tripping of the stop element.

174. In a calculating machine, numeral wheels, actuating means therefor comprising rotary elements, means for driving said actuating means including a motor, reciprocatory means for stopping the actuating means, including an oscillatory member, driven by one of said rotary elements, and means for preventing the operation of said stopping means, said oscillatory member acting to disable the preventing means before the actuating means have completed an operative cycle.

175. In a calculating machine, numeral wheels, reversible actuating means therefor comprising rotary elements, means for driving said actuating means including a motor, means for stopping the actuating means, having a direction of movement invariable with relation to the cycle of movement of the actuating means and including an oscillatory member, driven by one of said rotary elements, and means for preventing the operation of said stopping means, said oscillatory member acting to disable the preventing means before the actuating means have completed an operative cycle in either direction.

In testimony whereof I affix my signature.

GEORGE C. CHASE.

Certificate of Correction.

It is hereby certified that in Letters Patent No. 1,566,650, granted December 22, 1925, upon the application of George C. Chase, of South Orange, New Jersey, for an improvement in "Operating Means for Calculators," errors appear in the printed specification requiring correction as follows: Page 4, line 104, for the word "spring" read *springs;* page 9, line 52, for the syllable "ing" real *al;* line 64, for "spring" read *springs;* line 75, after the word "operates" insert a comma, and line 90, for "clip" read *slip;* page 11, line 11, claim 6, after the word "device" strike out the comma; page 17, line 8, claim 74, strike out the word "and" and insert the same to follow the word "position," line 10, same page and claim; page 21, line 110, claim 124, for "end" read *and;* page 22, line 116, claim 134, for "mens" read *means;* page 26, line 98, claim 172, strike out the words "have completed an operative cycle" and insert the same after the word "means" first occurrence, line 97; and that the said Letters Patent should be read with these corrections therein that the same may conform to the record of the case in the Patent Office.

Signed and sealed this 9th day of February, A. D. 1926.

[SEAL.]

WM. A. KINNAN,
*Acting Commissioner of Patents.*